(12) United States Patent
Zhang et al.

(10) Patent No.: US 11,496,320 B2
(45) Date of Patent: Nov. 8, 2022

(54) REGISTRATION METHOD AND APPARATUS BASED ON SERVICE-BASED ARCHITECTURE

(71) Applicant: HUAWEI TECHNOLOGIES CO., LTD., Guangdong (CN)

(72) Inventors: Bo Zhang, Shenzhen (CN); Lu Gan, Shenzhen (CN); Rong Wu, Shenzhen (CN); Shuaishuai Tan, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 154 days.

(21) Appl. No.: 16/803,624

(22) Filed: Feb. 27, 2020

(65) Prior Publication Data

US 2020/0195445 A1 Jun. 18, 2020

Related U.S. Application Data

(63) Continuation of application No. PCT/CN2018/081447, filed on Mar. 30, 2018.

(30) Foreign Application Priority Data

Aug. 31, 2017 (CN) .......................... 201710774290.9

(51) Int. Cl.
*H04L 9/32* (2006.01)
*H04L 9/30* (2006.01)

(52) U.S. Cl.
CPC .............. *H04L 9/3247* (2013.01); *H04L 9/30* (2013.01); *H04L 9/3213* (2013.01); *H04L 9/3242* (2013.01)

(58) Field of Classification Search
CPC ... H04L 9/3213; H04L 9/3242; H04L 9/3247; H04L 29/08; H04L 29/06; H04L 9/30; H04W 12/10; H04W 12/108; H04W 12/03

See application file for complete search history.

(56) References Cited

U.S. PATENT DOCUMENTS 7,546,629 B2 6/2009 Albert et al.
2013/0159723 A1\* 6/2013 Brandt ................ H04L 67/1097
709/224

(Continued)

FOREIGN PATENT DOCUMENTS

CN 102413464 A 4/2012
CN 105101194 A 11/2015

(Continued)

OTHER PUBLICATIONS

SAWG2 Meeting #119, "23.502: Registration procedures updates", S2-171151, Feb. 13-17, 2017 Dubrovnik, Croatia, total 9 pages.

(Continued)

*Primary Examiner* — Mohammad A Siddiqi
(74) *Attorney, Agent, or Firm* — Womble Bond Dickinson (US) LLP

(57) ABSTRACT

Embodiments of this application provide a registration method and apparatus based on a service-based architecture. In this method, a management network element determines configuration information of a function network element, where the configuration information includes a security parameter; and the management network element sends the configuration information to the function network element. The function network element receives the configuration information sent by the management network element; and the function network element sends a registration request to a control network element based on the configuration information, where the registration request includes the security parameter. The control network element receives the registration request sent by the function network element, where the registration request includes the security parameter; and the control network element verifies correctness of the security parameter, and determines validity of the registra- (Continued)

tion request based on the correctness of the security parameter.

15 Claims, 16 Drawing Sheets

(56) References Cited

U.S. PATENT DOCUMENTS

| | | | | |
|---|---|---|---|---|
| 2015/0280963 | A1* | 10/2015 | Bollapalli | H04L 12/5692 709/227 |
| 2017/0237742 | A1 | 8/2017 | Salmela et al. | |
| 2018/0006998 | A1* | 1/2018 | Chatterjee | H04L 65/1073 |
| 2019/0058741 | A1* | 2/2019 | Mufti | H04L 65/1073 |
| 2020/0028921 | A1* | 1/2020 | Cai | H04L 63/102 |
| 2020/0367148 | A1* | 11/2020 | Baek | H04W 48/18 |

FOREIGN PATENT DOCUMENTS

| | | |
|---|---|---|
| CN | 105323096 A | 2/2016 |
| CN | 106384028 A | 2/2017 |
| CN | 106550028 A | 3/2017 |
| WO | 2016070609 A1 | 5/2016 |

OTHER PUBLICATIONS

3GPP TR 28.802 V0.7.0:'3rd Generation Partnership Project; Technical Specification Group Services and System Aspects;Telecommunication management;Study on management aspects of next generation network architecture and features; (Release 14)', 2017-05, total 23 pages.
SA WG2 Meeting #122Bis:"Pseudo CR on TS 23.502 for NF registration, update and deregistration",Aug. 21-25, 2017, Sophia Antipolis, France,S2-175781,total 4 pages.
SA WG2 Meeting #122,S2-175102:'Network Function Service registration and de-registration', Ericsson, ZTE, DT, CMCC, total 2 pages.
3GPP TS 23.501 V1.2.0:"3rd Generation Partnership Project; Technical Specification Group Services and System Aspects;System Architecture for the 5G System; Stage 2(Release 15)",Jul. 2017,total 166 pages.
Huawei et al.,"Pseudo CR on TS 23.501 for clarification of NF service authorizationinformation",SA WG2 Meeting #122Bis S2-176463,Aug. 21-25, 2017, Sophia Antipolis, France,total 4 pages.
ZTE,"Classification and Update of NF Instance Parameters",3GPP TSG CT4 Meeting #79 C4-174151,Krakow Poland; 21 S—Aug. 25, 2017,total 4 pages.
Huawei et al.,"Reuse anchor key for fasting untrusted non-3GPP access",3G PP TSG SA WG3 (Security) Meeting #868is S3-170682,Mar. 27-31, 2017, Busan, Korea,total 4 pages.
Huawei et al.,"NF Service Authorization",SA WG2 Meeting #118bis S2-170057,Jan. 16-20, 2017, Spokane, Washington, USA,total 2 pages.

* cited by examiner

REGISTRATION METHOD AND APPARATUS BASED ON SERVICE-BASED ARCHITECTURE

CROSS-REFERENCE TO RELATED APPLICATIONS

This application is a continuation of International Application No. PCT/CN2018/081447, filed on Mar. 30, 2018, which claims priority to Chinese Patent Application No. 201710774290.9, filed on Aug. 31, 2017. The disclosures of the aforementioned applications are hereby incorporated by reference in their entireties.

TECHNICAL FIELD

This application relates to the field of communications technologies, and in particular, to a registration method and apparatus based on a service-based architecture.

BACKGROUND

During a discussion of a core network architecture of a 5G network, a service-based architecture solution centered on a network function (NF) is proposed. In the service-based architecture solution, decoupling and integration of NFs are implemented through modularization. Each NF obtained through decoupling independently expands, independently evolves, and is deployed on demand, and all NFs on a control plane interact with each other through a service-based interface. One service may be invoked by a plurality of NFs, to reduce a coupling degree defined by interfaces between the NFs, and finally to customize the functions of an entire network on demand, thereby flexibly supporting different service scenarios and requirements.

In the service-based architecture solution, a control network element such as an NF repository function (NRF) usually provides functions such as registration, discovery, and authorization of a service for an NF, to implement on-demand configuration of the NF and the service and interconnection between NFs. Currently, in a possible security registration method, a management network element first configures a corresponding parameter for a to-be-registered function network element, and then the to-be-registered function network element directly sends a registration request to an NRF. The NRF directly completes registration after receiving the registration request. The NRF adds the registered function network element to an NF topology, and sends a response message to the registered function network element.

Because a communications interface between the to-be-registered function network element and the NRF is not protected by a secure channel, there is a potential risk that an attacker modifies a parameter or an attacker pretends to be the to-be-registered function network element to attempt to access the NRF. In this case, in the foregoing security registration method based on a service-based architecture, the NRF does not perform security authentication on the registration request sent by the to-be-registered function network element, resulting in comparatively low security.

SUMMARY

Embodiments of this application provide a registration method and apparatus based on a service-based architecture, so that a control network element performs security authentication on a registration request of a function network element, thereby improving security.

According to a first aspect, a registration method based on a service-based architecture is provided. In this method, a function network element sends a registration request to a control network element, where the registration request includes a security parameter. The control network element receives the registration request sent by the function network element, verifies correctness of the security parameter included in the registration request, and determines, by verifying the correctness of the security parameter, whether the registration request sent by the NF is valid, to implement security authentication on the registration request of the function network element, thereby improving security.

The security parameter may be determined by a management network element. The management network element adds the determined security parameter to configuration information and sends the configuration information to the function network element. After receiving the configuration information sent by the management network element, the function network element adds the security parameter included in the configuration information to the registration request and sends the registration request to the management network element.

In the registration method provided in this embodiment of this application, after receiving the registration request sent by the function network element, the management network element may determine, by verifying the correctness of the security parameter included in the registration request, validity of the registration request sent by the function network element. When determining that the registration request sent by the function network element is valid, the management network element adds the function network element to a function network element topology; or when determining that the registration request sent by the function network element is invalid, the management network element refuses to add the function network element to a function network element topology. Therefore, communication security can be improved to some extent using the registration method provided in this embodiment of this application.

In one embodiment, the security parameter determined by the management network element includes an asymmetric token.

The management network element may perform a digital signature algorithm on a function network element profile and an identifier of the function network element based on a private key of the management network element to generate a digital signature, and encrypt the digital signature, the function network element profile, and the identifier of the function network element based on a public key of the control network element to generate the asymmetric token.

Alternatively, the management network element may perform, based on a private key of the management network element, a digital signature algorithm on a function network element profile, an identifier of the function network element, and a shared key between the function network element and the control network element to generate a digital signature, and encrypt the digital signature, the function network element profile, the identifier of the function network element, and the shared key between the function network element and the control network element based on a public key of the control network element to generate the asymmetric token.

The shared key may be a session key generated by the management network element. The session key is used for security communication or authentication between the function network element and the control network element. The session key may be generated by the management network element by encrypting the identifier of the function network element based on a preset root key. Alternatively, the session key may be generated by the management network element by encrypting the identifier of the function network element based on a derivation key, and the derivation key is obtained by the management network element by performing key derivation on a preset root key, or the derivation key is a key of the function network element that is stored by the management network element.

Further, in addition to the digital signature, the function network element profile, the identifier of the function network element, and the shared key between the function network element and the control network element, parameters encrypted based on the public key of the control network element may further include one or more of an identifier of the control network element, a type of the function network element, a PLMN identifier, an identifier of a service supported by the function network element, a random number of the digital signature, and the like, and at least one of a validity period of the token, a random number of the token, a counter, and a sequence number. In addition to the function network element profile, the identifier of the function network element, and the shared key between the function network element and the control network element, parameters for performing the digital signature algorithm by the management network element based on the private key of the management network element may further include one or more of the identifier of the control network element, the type of the function network element, the PLMN identifier, the identifier of the service supported by the function network element, and the like, and at least one of a validity period of the signature, a random number of the signature, a counter, and a sequence number.

The management network element according to one embodiment sends the generated asymmetric token to the function network element as the security parameter. The function network element sends the asymmetric token to the control network element. The control network element receives the asymmetric token, decrypts the asymmetric token using a private key of the control network element, to obtain the digital signature, and verifies correctness of the digital signature using a public key of the management network element and signed content.

The signed content may be the same as the parameters for performing the signature algorithm, and may include, for example, the function network element profile and the identifier of the function network element. In addition to the function network element profile and the identifier of the function network element, the signed content may further include one or more of the shared key between the function network element and the control network element, the identifier of the control network element, the type of the function network element, the PLMN identifier, the identifier of the service supported by the function network element, the random number of the digital signature, and the like, and at least one of the validity period of the token, the random number of the token, the counter, and the sequence number.

In another embodiment, the security parameter determined by the management network element includes a symmetric token.

The management network element may perform, based on a symmetric key shared between the management network element and the control network element, a message authentication code algorithm on an identifier of the function network element and a function network element profile to generate a message authentication code, and encrypt, based on the symmetric key shared between the management network element and the control network element, the message authentication code, the function network element profile, and the identifier of the function network element to generate the symmetric token.

Alternatively, the management network element may perform, based on a symmetric key shared between the management network element and the control network element, a message authentication code algorithm on a shared key between the function network element and the control network element, an identifier of the function network element, and a function network element profile to generate a message authentication code, and encrypt, based on the symmetric key shared between the management network element and the control network element, the message authentication code, the function network element profile, the identifier of the function network element, and the shared key between the function network element and the control network element to generate the symmetric key.

The shared key between the function network element and the control network element may be a session key generated by the management network element. The session key is used for security communication or authentication between the function network element and the control network element. The session key may be generated by the management network element by encrypting the identifier of the function network element based on a preset root key. Alternatively, the session key may be generated by the management network element by encrypting the identifier of the function network element based on a derivation key, and the derivation key is obtained by the management network element by performing key derivation on a preset root key, or the derivation key is a key of the function network element that is stored by the management network element.

Further, in addition to the message authentication code, the function network element profile, the identifier of the function network element, and the shared key between the function network element and the control network element, parameters encrypted by the management network element based on the symmetric key shared between the management network element and the control network element may further include one or more of an identifier of the control network element, a type of the function network element, a PLMN identifier, an identifier of a service supported by the function network element, a random number of the message authentication code, and the like, and at least one of a validity period of the token, a random number of the token, a counter, and a sequence number. In addition to the function network element profile, the identifier of the function network element, and the shared key between the function network element and the control network element, parameters for performing the message authentication code algorithm by the management network element based on the symmetric key shared between the management network element and the control network element may further include one or more of the identifier of the control network element, the type of the function network element, the PLMN identifier, the identifier of the service supported by the function network element, and the like, and at least one of a validity period of the message authentication code, a random number of the message authentication code, a counter, and a sequence number.

The management network element according to one embodiment sends the generated symmetric token to the function network element as the security parameter. The function network element sends the symmetric token to the control network element. The control network element receives the symmetric token, decrypts the symmetric token using the symmetric key, to obtain the message authentication code, and verifies correctness of the message authentication code using the symmetric key shared between the management network element and the control network element, and content protected by the message authentication code.

The content protected by the message authentication code may be the same as the parameters for performing the message authentication code algorithm, and may include, for example, the function network element profile, the identifier of the function network element, and the shared key between the function network element and the control network element. In addition to the function network element profile, the identifier of the function network element, and the shared key between the function network element and the control network element, the content may further include one or more of the identifier of the control network element, the type of the function network element, the PLMN identifier, the identifier of the service supported by the function network element, and the like, and at least one of the validity period of the message authentication code, the random number of the message authentication code, the counter, and the sequence number.

In another embodiment, the security parameter determined by the management network element includes a first message authentication code.

The management network element may perform a message authentication code algorithm on a function network element profile and an identifier of the function network element based on the symmetric key shared between the management network element and the control network element to generate the first message authentication code.

Further, in addition to the function network element profile and the identifier of the function network element, parameters for performing the message authentication code algorithm by the management network element to generate the first message authentication code based on the symmetric key shared between the management network element and the control network element may further include one or more of an identifier of the control network element, a type of the function network element, a PLMN identifier, an identifier of a service supported by the function network element, and the like, and at least one of a validity period of the first message authentication code, a random number of the first message authentication code, a counter, and a sequence number.

The management network element according to one embodiment sends the generated first message authentication code to the function network element as the security parameter. The function network element sends the first message authentication code to the control network element. The control network element receives the first message authentication code, and verifies correctness of the first message authentication code using the symmetric key shared between the management network element and the control network element and content protected by the first message authentication code. The content protected by the first message authentication code is the same as the parameters for performing the message authentication code algorithm to generate the first message authentication code. For example, the content may include the function network element profile and the identifier of the function network element. In addition to the function network element profile and the identifier of the function network element, the content may further include one or more of the identifier of the control network element, the type of the function network element, the PLMN identifier, the identifier of the service supported by the function network element, and the like, and at least one of the validity period of the first message authentication code, the random number of the first message authentication code, a counter, and a sequence number.

In another embodiment, the security parameter determined by the management network element includes a first digital signature.

The management network element may perform a digital signature algorithm on a function network element profile and an identifier of the function network element based on a private key of the management network element to generate the first digital signature.

Further, in addition to the function network element profile and the identifier of the function network element, parameters for performing the digital signature algorithm by the management network element based on the private key of the management network element may further include one or more of an identifier of the control network element, a type of the function network element, a PLMN identifier, an identifier of a service supported by the function network element, and the like, and at least one of a validity period of the first digital signature, a random number of the first digital signature, a counter, and a sequence number.

The management network element according to one embodiment sends the generated first digital signature to the function network element as the security parameter. The function network element sends the first digital signature to the control network element. The control network element receives the first digital signature, decrypts the first digital signature using a private key of the control network element, to obtain the digital signature, and verifies correctness of the first digital signature using a public key of the management network element and content signed using the first digital signature.

The content signed by using the first digital signature may be the same as the parameters for performing the signature algorithm to generate the first digital signature, and may include, for example, the function network element profile and the identifier of the function network element. In addition to the function network element profile and the identifier of function network element, the content may further include one or more of the identifier of the control network element, the type of the function network element, the PLMN identifier, the identifier of the service supported by the function network element, and the like, and at least one of the validity period of the first digital signature, the random number of the first digital signature, a counter, and a sequence number.

In this embodiment of this application, the control network element may authenticate the function network element by verifying the asymmetric token, the symmetric token, the first message authentication code, or the first digital signature generated by the management network element.

In another embodiment, the management network element generates a first message authentication code and a third message authentication code, and sends the first message authentication code and the third message authentication code to the function network element. The function network element sends the first message authentication code to the control network element, and the control network element verifies validity of the first message authentication code, to authenticate the function network element. The control network element generates a second message authentication code and sends the second message authentication code to the function network element. The function network element verifies whether the third message authentication code is consistent with the second message authentication code, to verify validity of the second message authentication code, and authenticates the control network element using the validity of the second message authentication code. The function network element and the control network element can be mutually authenticated in this embodiment of this application.

The second message authentication code may be generated by the control network element by performing a message authentication code algorithm on an identifier of the function network element and an identifier of the control network element based on a symmetric key shared between the management network element and the control network element. Further, in addition to the identifier of the function network element and the identifier of the control network element, parameters for performing the message authentication code algorithm by the control network element to generate the second message authentication code based on the symmetric key shared between the management network element and the control network element may further include one or more of the function network element profile, the type of the function network element, a PLMN identifier, an identifier of a service supported by the function network element, and the like, and at least one of a validity period of the second message authentication code, a of the second message authentication code, a counter, and a sequence number.

The third message authentication code may be generated by the management network element by performing a message authentication code algorithm on the identifier of the function network element and the identifier of the control network element based on the symmetric key shared between the management network element and the control network element. Further, in addition to the identifier of the function network element and the identifier of the control network element, parameters for performing the message authentication code algorithm by the management network element to generate the third message authentication code based on the symmetric key shared between the management network element and the control network element may further include one or more of the function network element profile, the type of the function network element, the PLMN identifier, the identifier of the service supported by the function network element, and the like, and at least one of a validity period of the third message authentication code, a random number of the third message authentication code, a counter, and a sequence number.

In another embodiment, the management network element generates a first digital signature, and sends the first digital signature to the function network element. The function network element sends the first digital signature to the control network element, and the control network element verifies validity of the first digital signature, to authenticate the function network element. The control network element generates a second digital signature, and sends the second digital signature to the function network element. The function network element verifies whether the first digital signature is consistent with the second digital signature, to verify validity of the second digital signature, and authenticate the control network element using the validity of the second digital signature. The function network element and the control network element can be mutually authenticated in this embodiment of this application.

The second digital signature may be generated by the control network element by performing a digital signature algorithm on an identifier of the function network element and an identifier of the control network element based on a private key of the control network element. Further, in addition to the identifier of the function network element and the identifier of the control network element, parameters for performing the digital signature algorithm by the control network element based on the private key of the control network element may further include one or more of a function network element profile, a type of the function network element, a PLMN identifier, an identifier of a service supported by the function network element, and the like, and at least one of a validity period of the second digital signature, a random number of the second digital signature, a counter, and a sequence number.

In another embodiment, the security parameter sent by the function network element to the control network element may include a fourth message authentication code generated by the function network element.

The function network element may perform a message authentication code algorithm on an identifier of the function network element based on a derivation key, to generate the fourth message authentication code.

The derivation key used by the function network element to generate the fourth message authentication code may be obtained by a management network element by performing key derivation on a preset root key, or is a key of the function network element that is stored by the management network element according to one embodiment.

In one embodiment, the function network element sends the fourth message authentication code and the identifier of the function network element to the control network element. After receiving the fourth message authentication code and the identifier of the function network element, the control network element sends the identifier of the function network element to the management network element, and receives a fifth message authentication code sent by the management network element. The control network element verifies correctness of the fourth message authentication code by comparing whether the fourth message authentication code is consistent with the fifth message authentication code, and determines, based on the correctness of the fourth message authentication code, validity of the registration request sent by the function network element. In this embodiment of this application, if the fourth message authentication code is consistent with the fifth message authentication code, the function network element determines that the fourth message authentication code is correct, determines that the registration request sent by the function network element is valid, and determines that authentication on the function network element succeeds, so that the function network element performs authentication on the control network element.

In another embodiment, the function network element sends the fourth message authentication code to the control network element. After receiving the fourth message authentication code, the function network element sends the fourth message authentication code to the management network element. The management network element receives the fourth message authentication code sent by the control network element, generates a fifth message authentication code based on a pre-stored derivation key, and compares whether the fourth message authentication code is consistent with the fifth message authentication code, to verify the fourth message authentication code. If the fourth message authentication code is consistent with the fifth message authentication code, the function network element determines that the fourth message authentication code is correct, determines that the registration request sent by the function network element is valid, and determines that the function network element can be authenticated. The management network element sends a verification result of the fourth message authentication code to the control network element. The control network element receives the verification result that is of the fourth message authentication code and that is sent by the management network element, and determines correctness of the fourth message authentication code based on the verification result that is of the fourth message authentication code and that is sent by the management network element, to authenticate the function network element.

The fifth message authentication code may be generated by the management network element by performing a message authentication code algorithm on the identifier of the function network element and an identifier of the control network element based on the derivation key.

Parameters for performing the message authentication code algorithm in generation processes of the fourth message authentication code and the fifth message authentication code may be the same. In addition to the identifier of the function network element and the identifier of the control network element, the parameters may further include one or more of a function network element profile, a type of the function network element, a PLMN identifier, an identifier of a service supported by the function network element, and the like, and at least one of a validity period of the message authentication code, a random number of the message authentication code, a counter, and a sequence number.

In another embodiment, be between the control network element and the function network element may establish a secure channel based on a session key or a derivation key of a session key.

The control network element may obtain the session key by decrypting an asymmetric token or a symmetric token, where the asymmetric token or the symmetric token is generated based on the session key. Alternatively, the session key may be generated by the management network element by encrypting an identifier of the function network element based on a preset root key. Alternatively, the control network element obtains the session key from the management network element, where the session key is generated by the management network element by encrypting an identifier of the function network element based on a derivation key, the derivation key is obtained by the management network element by performing key derivation on a preset root key, or the derivation key is a key of the function network element that is stored by the management network element.

According to a second aspect, a registration apparatus based on a service-based architecture is provided. The registration apparatus may be applied to a management network element, and the registration apparatus applied to the management network element has functions of implementing the management network element in any one of the first aspect and the designs of the first aspect. The functions may be implemented by hardware, or may be implemented by hardware executing corresponding software. The hardware or software includes one or more modules corresponding to the foregoing functions. The modules may be software and/or hardware.

In one embodiment, the registration apparatus applied to the management network element includes a processing unit and a sending unit, and may further include a receiving unit. The receiving unit, the processing unit, and the sending unit may be corresponding to the foregoing functional operations performed by the management network element. Details are not described herein again.

In another embodiment, the registration apparatus applied to the management network element includes a processor, a transceiver, and a memory. The memory is coupled to the processor, and is configured to store various software programs and/or a plurality of sets of instructions. The processor invokes the programs or instructions stored in the memory to perform the foregoing functional operations performed by the management network element, and controls the transceiver to send and receive a signal.

According to a third aspect, a registration apparatus based on a service-based architecture is provided. The registration apparatus may be applied to a function network element, and the registration apparatus applied to the function network element has functions of implementing the function network element in any one of the first aspect and the designs of the first aspect. The functions may be implemented by hardware, or may be implemented by hardware executing corresponding software. The hardware or software includes one or more modules corresponding to the foregoing functions. The modules may be software and/or hardware.

In one embodiment, the registration apparatus applied to the function network element includes a receiving unit and a sending unit, and may further include a processing unit. The receiving unit, the processing unit, and the sending unit may be corresponding to the foregoing functional operations performed by the function network element. Details are not described herein again.

In another embodiment, the registration apparatus applied to the function network element includes a processor, a transceiver, and a memory. The memory is coupled to the processor, and is configured to store various software programs and/or a plurality of sets of instructions. The processor invokes the programs or instructions stored in the memory to perform the foregoing functional operations performed by the function network element, and controls the transceiver to send and receive a signal.

According to a fourth aspect, a registration apparatus based on a service-based architecture is provided. The registration apparatus may be applied to a control network element, and the registration apparatus applied to the control network element has functions of implementing the control network element in any one of the first aspect and the designs of the first aspect. The functions may be implemented by hardware, or may be implemented by hardware executing corresponding software. The hardware or software includes one or more modules corresponding to the foregoing functions. The modules may be software and/or hardware.

In one embodiment, the registration apparatus applied to the control network element includes a receiving unit and a processing unit, and may further include a sending unit. The receiving unit, the processing unit, and the sending unit may be corresponding to the foregoing functional operations performed by the control network element. Details are not described herein again.

In another embodiment, the registration apparatus applied to the control network element includes a processor, a transceiver, and a memory. The memory is coupled to the processor, and is configured to store various software programs and/or a plurality of sets of instructions. The processor invokes the programs or instructions stored in the memory to perform the foregoing functional operations performed by the control network element, and controls the transceiver to send and receive a signal.

According to a fifth aspect, a computer storage medium is provided. The computer storage medium stores a computer instruction. When the instruction is run on a computer, any function of the management network element, the function network element, or the control network element in any one of the first aspect and the possible designs of the first aspect can be implemented.

According to a sixth aspect, a computer program product is provided. The computer program product includes a computer program. The computer program is used to implement any function of the management network element, the function network element, or the control network element in any one of the first aspect and the possible designs of the first aspect.

According to the registration method and apparatus based on a service-based architecture provided in the embodiments of this application, after receiving the registration request sent by the function network element, the management network element may determine, by verifying the correctness of the security parameter included in the registration request, validity of the registration request sent by the function network element. When determining that the registration request sent by the function network element is valid, the management network element adds the function network element to a function network element topology; or when determining that the registration request sent by the function network element is invalid, the management network element refuses to add the function network element to a function network element topology. Therefore, communication security can be improved to some extent using the registration method provided in the embodiments of this application.

DESCRIPTION OF EMBODIMENTS

The following describes technical solutions in embodiments of this application with reference to accompanying drawings.

Figure 1:
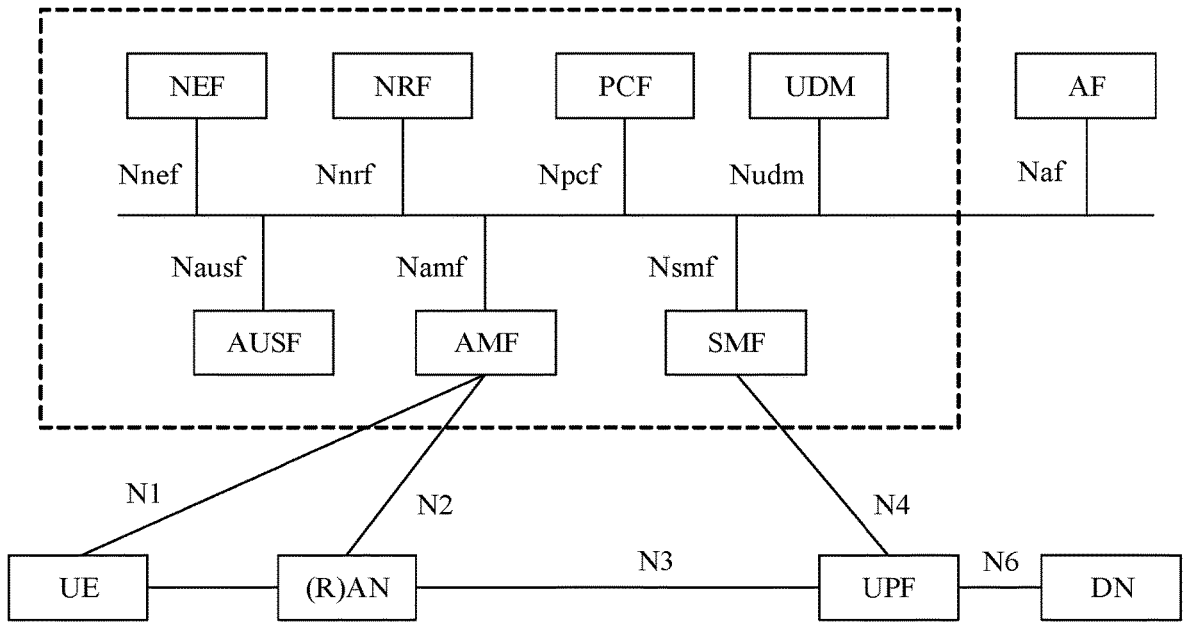
FIG. 1 is a schematic diagram of a service-based architecture to which a registration method is applied according to an embodiment of this application.

A registration method provided in the embodiments of this application may be applied to a service-based architecture shown in FIG. 1. In FIG. 1, in the service-based architecture on a control plane of a core network, decoupling and integration between NFs are implemented through modularization, and the NFs interact with each other through a service-based interface. For example, in FIG. 1, NFs such as a network exposure function (NEF), an NRF, a policy control function (PCF), a unified data management (UDM), an application function (AF), an authentication server function (AUSF), an access and mobility management function (AMF), and a session management function SMF) may interact with each other through a service-based interface exhibited by the NEF (Nnef), a service-based interface exhibited by the AUSF (Nausf), a service-based interface exhibited by the NRF (Nnrf), a service-based interface exhibited by the AMF (Namf), a service-based interface exhibited by the PCF (Npcf), a service-based interface exhibited by the SMF (Nsmf), a service-based interface exhibited by the UDM (Nudm), and a service-based interface exhibited by the AF (Naf). In addition, one service may be invoked by a plurality of NFs, to reduce a coupling degree defined by interfaces between the NFs, and customize the NFs on demand. In FIG. 1, user equipment (UE) may access the AMF in the core network using a radio access network (RAN), or may directly access the AMF. An interface between the UE and the AMF is an N1 interface, and an interface between the RAN and the AMF is an N2 interface. The RAN may interact with a user plane function (UPF) through an N3 interface. The UPF may access the SMF in the core network through an N4 interface, and interact with the core network. The UPF may also access a data network (DN) through an N6 interface, and interact with the DN.

The network element names and interface definitions shown in FIG. 1 are quoted from definitions in the 5th generation (5G) and the 3rd Generation Partnership Project (3GPP) draft. The figure is only for brief description of the interface definitions between network function entities. In the figure, a block represents a specific NF definition, and a connection line represents an interface definition. For specific definitions, refer to the related definitions in the 5G and the 3GPP draft.

In the foregoing service-based architecture, if a function network element needs to be newly added, the following two implementations may be used: In one implementation, a management network element that has network element management and registration functions sends a registration request to a control network element that has a registration information storage function, where the registration request includes configuration information of the newly added function network element. The control network element completes registration after receiving the registration request, adds the registered function network element to an NF topology, and sends a response message to the management network element. In the other implementation, a management network element configures a corresponding parameter for a to-be-registered function network element, and then the to-be-registered function network element directly sends a registration request to a control network element. The control network element directly completes registration after receiving the registration request. The NRF adds the registered function network element to an NF topology, and sends a response message to the registered function network element.

With rapid development of a future 5G communication service, a mass of function network elements may need to be newly added. In the foregoing first implementation, the management network element needs to send the configuration information to the control network element and the newly added function network element. Therefore, the foregoing first implementation may be no longer applicable to the future 5G communication service. For the future 5G communication service, the second implementation may be used to register a newly added function network element. However, in the second implementation, although the management network element does not need to send the configuration information to the control network element, and the newly added function network element directly sends the registration request to the control network element, a communications interface between the newly added function network element and the control network element is not protected by a secure channel. Consequently, there is a potential risk that an attacker modifies a parameter, or an attacker pretends to be the to-be-registered function network element to attempt to access the control network element, resulting in comparatively low communication security.

In view of this, the embodiments of this application provide a security registration method based on a service-based architecture. In the registration method, security authentication is performed between a control network element and a function network element, to improve communication security.

It can be understood that, the management network element in the embodiments of this application may be any function entity that has network element management and control functions, for example, an operation, administration and maintenance (OAM) network element or a slice management network element (Slice manager), or may be an entity such as a terminal, a base station, a controller, or a server. This is not limited in the embodiments of this application. For ease of description, an example that the management network element is an OAM is used in the subsequent descriptions. The control network element in the embodiments of this application may be any function entity that has a registration information storage function and that controls a network element. For example, the control network element may be an NRF, or may be an entity such as a terminal, a base station, a controller, or a server. This is not limited in the embodiments of this application. For ease of description, an example that the control network element is an NRF is used in the subsequent descriptions. The function network element in the embodiments of this application is an entity having a particular function. For example, the function network element may be an NF, or may be an entity such as a terminal, a base station, a controller, or a server. This is not limited in the embodiments of this application. For ease of description, an example that the function network element is an NF is used in the subsequent descriptions.

Figure 2:
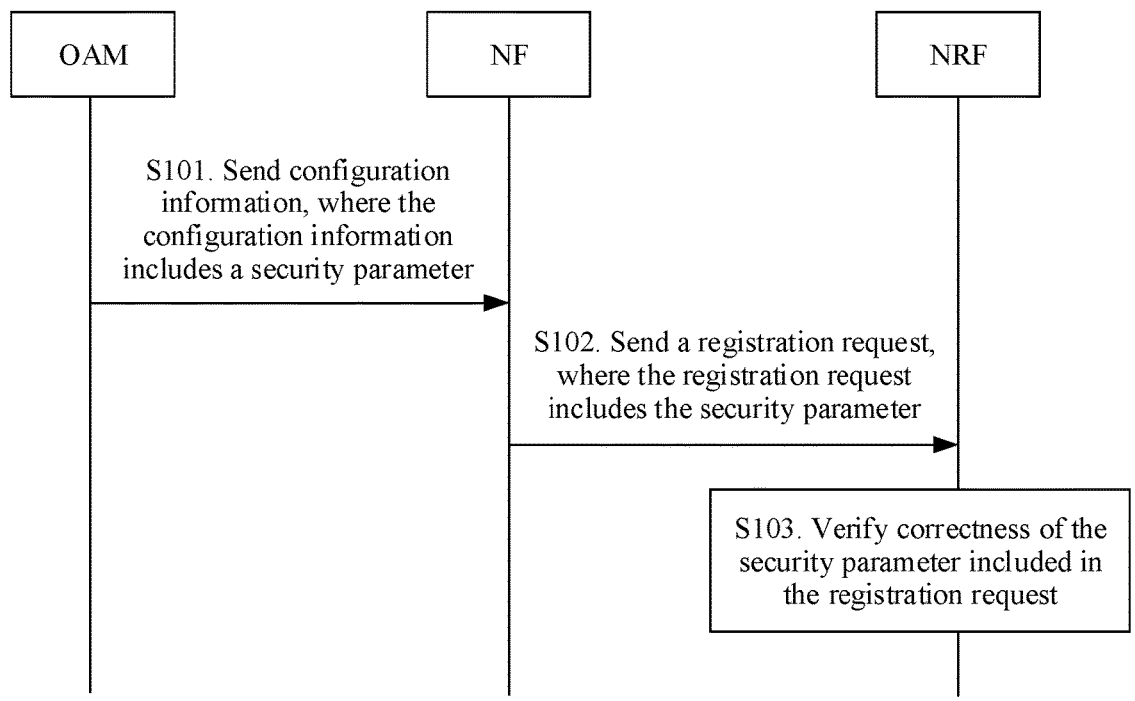
FIG. 2 is an implementation flowchart of a registration method based on a service-based architecture according to an embodiment of this application.

FIG. 2 is an implementation flowchart of a registration method based on a service-based architecture according to an embodiment of this application. Referring to FIG. 2, the method includes the following operations.

Operation S101. An OAM determines configuration information of an NF, where the configuration information includes a security parameter. The OAM sends, to the NF, the determined configuration information that includes the security parameter.

Operation S102. The NF obtains the configuration information sent by the OAM, and sends a registration request to an NRF. The registration request includes the security parameter and the configuration information of the NF.

Operation S103. The NRF receives the registration request sent by the NF, verifies correctness of the security parameter included in the registration request, and determines, by verifying the correctness of the security parameter, whether the registration request sent by the NF is valid.

In this embodiment of this application, the configuration information sent by the OAM to the NF includes the security parameter, and the NF adds the security parameter to the registration request, and sends the registration request to the NRF. After receiving the registration request, the NRF may determine, by verifying the correctness of the security parameter included in the registration request, validity of the registration request sent by the NF. When determining that the registration request sent by the NF is valid, the NRF adds the NF to an NF topology, or when determining that the registration request sent by the NF is invalid, the NRF refuses to add the NF to an NF topology. Therefore, communication security can be improved to some extent using the registration method provided in this embodiment of this application.

The security parameter described in this embodiment of this application may be a token, a digital signature, or a message authentication code (MAC). Different security parameters are generated using different methods, and processes of verifying the security parameters are also different.

In this embodiment of this application, a process of generating and verifying the security parameter is described below with reference to actual application.

Embodiment 1: The security parameter includes a token, and the token is generated based on an asymmetric key.

Figure 3:
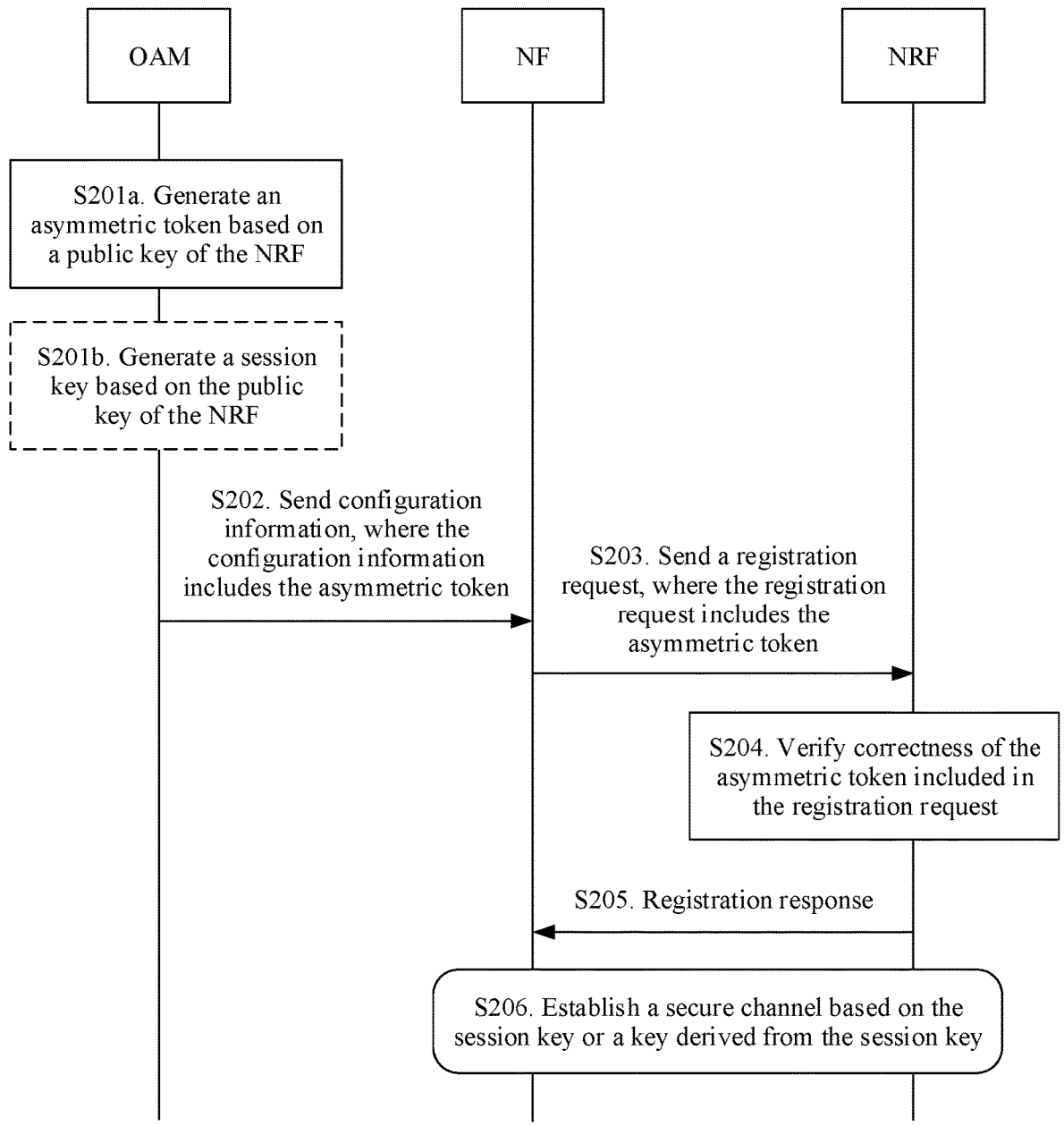
FIG. 3 is an implementation flowchart of security registration based on a service-based architecture according to Embodiment 1 of this application.

FIG. 3 is an implementation flowchart of security registration based on a service-based architecture according to Embodiment 1 of this application. Referring to FIG. 3, the method includes the following operations.

Operation S201a. The OAM generates an asymmetric token.

In this embodiment of this application, the OAM may generate the asymmetric token based on a public key (PKnrf) of the NRF.

When the OAM generates the asymmetric token, the OAM needs to pre-store a public key (PKoam) of the OAM, a private key (SKoam) of the OAM, and the public key (PKnrf) of the NRF. The PKnrf may be initially preset in the OAM, or may be obtained from the NRF during interaction between the OAM and the NRF. The NRF also needs to pre-store the PKoam, the PKnrf, and a private key (SKnrf) of the NRF. The PKoam may be initially preset in the NRF, or may be sent by the OAM to the NRF during interaction between the OAM and the NRF.

Specifically, the OAM may encrypt a digital signature, an NF profile (NF profile), and an identifier (ID_NF) of the NF based on the PKoam, to generate the asymmetric token.

The digital signature may be generated by the OAM by performing a digital signature algorithm on the NF profile and the ID_NF based on the SKoam.

In one embodiment, in addition to the digital signature, the NF profile, and the ID_NF, parameters encrypted by the OAM based on the PKoam may further include one or more of an identifier (ID_NRF) of the NRF, a type (NF type) of the NF, a public land mobile network identifier (Public Land Mobile Network ID, PLMN ID), and an identifier of a service supported by the NF, a random number of the digital signature (nonce_sign), and the like, and at least one of a validity period (time), a random number of the token (nonce_token), a counter, and a sequence number.

Specifically, in the parameters used in the foregoing process of generating the asymmetric token, the NF profile is an optional parameter, the ID_NRF is an optional parameter, the NF type is an optional parameter, the PLMN ID is an optional parameter, and the identifier of the service supported by the NF is optional. The nonce_token and the nonce_sign are randomly selected by the OAM, and the two nonces may be the same or may be different, and are both optional parameters. The time may be a validity period of the key, and a specific form thereof may include a start time and an end time, or may include a start time and an effective time, or may be an end time. In a non-roaming scenario, the PLMN ID may include a PLMN ID of a home network of the NF. In a roaming scenario, the NF is in a visited network, but information about the NF is stored in a home network. Therefore, the PLMN ID may include at least one of a PLMN ID of the home network and a PLMN ID of the visited network.

In one embodiment, in addition to the NF profile and the ID_NF, parameters for performing the digital signature algorithm by the OAM based on the SKoam when the OAM generates the digital signature further include one or more of an ID_NRF, an NF type, a PLMN ID, an identifier of a service supported by the NF, and the like, and at least one of a time, a nonce_sign, a counter, and a sequence number. In other words, signed content may include the NF profile and the ID_NF, and may further include the ID_NRF, the NF type, the PLMN ID, the identifier of the service supported by the NF, the time, the nonce_sign, the counter, the sequence number, and the like. In the signed content, the NF profile is an optional parameter, the NF type is an optional parameter, the PLMN ID is an optional parameter, and the identifier of the service supported by the NF is an optional parameter.

Operation S201b. The OAM determines a session key (K_session).

In this embodiment of this application, the NF and the NRF may share the K_session, and the K_session may be used for security communication or authentication between the NF and the NRF. Certainly, determining of the K_session is an optional parameter operation. When the K_session does not need to be used to perform security communication or authentication, the operation of determining the K_session may not be included.

In this embodiment of this application, if the OAM generates the K_session, the K_session may be used as a shared key between the NF and the NRF. In the foregoing process of generating the asymmetric token, the OAM may further encrypt the K_session based on the PKoam, in addition to the foregoing related parameters. In addition to signing the foregoing related parameters, the K_session may further be signed.

In this embodiment of this application, in one embodiment, the K_session may be randomly selected by the OAM, or may be derived from the ID_NF by the OAM based on a preset root key. Alternatively, the OAM may derive, based on the preset root key, the K_session from one or more of the ID_NF, the ID_NRF, the NF profile, the NF type, the PLMN ID, and the identifier of the service supported by the NF. In addition to encrypting the foregoing parameters, the OAM may further derive the K_session from at least one of a time, a random number of the session key (nonce_session), a counter, and a sequence number. In another embodiment, the K_session may be derived by the OAM from the ID_NF based on a derivation key. Alternatively, the OAM may encrypt, based on a derivation key, one or more of the ID_NF, the ID_NRF, the NF profile, the NF type, the PLMN ID, and the identifier of the service supported by the NF, to generate the K_session. In addition to the foregoing parameters, the OAM may further derive the K_session from at least one of a time, a random number of the session key (nonce_session), a counter, and a sequence number. The derivation key used to generate the K_session may be obtained by the OAM by performing key derivation on a preset root key, or may be a key of the NF that is stored by the OAM. In addition, the K_session may alternatively be a parameter randomly selected by the OAM.

In the parameters used to generate the K_session in this embodiment of this application, the ID_NRF is an optional parameter, the NF profile is an optional parameter, the NF type is an optional parameter, the PLMN ID is an optional parameter, the identifier of the service supported by the NF is optional, and at least one of the time, the nonce_session, the counter, and the sequence number is an optional parameter, where the nonce_session is randomly selected by the OAM.

Operation S202. The OAM determines configuration information, and sends the configuration information to the NF, where the configuration information includes the foregoing generated asymmetric token.

In this embodiment of this application, the configuration information determined by the OAM and sent to the NF may further include the ID_NF and the token, and may further include at least one of the K_session, the ID_NRF, the NF profile, the NF type, and the like.

Operation S203. The NF receives the configuration information sent by the OAM, and sends a registration request to the NRF based on the configuration information, where the registration request includes the asymmetric token that is included in the configuration information, and may include at least one of the ID_NF, the ID_NRF, the NF profile, the NF type, and the like.

Operation S204. The NRF receives the registration request sent by the NF, and verifies correctness of the asymmetric token included in the registration request.

Specifically, the NRF may decrypt, using the SKnrf, the asymmetric token included in the registration request, to obtain a digital signature, and verify correctness of the digital signature using the PKoam and the signed content. If verification on the digital signature succeeds, the NRF determines that the asymmetric token sent by the NF is correct, the registration request sent by the NF is valid, and the NF is authorized by the OAM. In this case, the NRF adds the NF to an NF topology based on the registration request sent by the NF, and stores registration information of the NF. If verification on the digital signature fails, the NRF determines that the asymmetric token sent by the NF is incorrect, the registration request sent by the NF is invalid, and the NF is not authorized by the OAM. In this case, the NRF rejects the registration request of the NF.

Operation S205. The NRF sends a registration response to the NF, to notify the NF whether the NF is successfully registered.

In a possible example, if the NRF may further decrypt, using the SKnrf, the asymmetric token included in the registration request, to obtain the K_session, the NF and the NRF share the K_session. The NRF may use the K_session to perform the following operation S206, where operation S206 is an optional operation.

Operation S206. When determining that the registration request sent by the NF is valid, the NRF establishes a secure channel with the NF based on the K_session or a key derived from the K_session.

The key derived from the K_session may be obtained by performing a key derivation algorithm on at least one of the K_session, a tunnel establishment counter, and a session ID.

In the foregoing embodiment of this application, the configuration information sent by the OAM to the NF includes the asymmetric token, and the asymmetric token is generated by the OAM based on the PKnrf. The NF adds the asymmetric token to the registration request, and sends the registration request to the NRF. After receiving the registration request, the NRF may determine, by verifying the correctness of the asymmetric token included in the registration request, validity of the registration request sent by the NF, to authenticate the NF.

Further, the NF and the NRF may share the K_session, and perform security communication or authentication between the NF and the NRF using the shared K_session.

Embodiment 2: The security parameter includes a token, and the token is generated based on a symmetric key.

Figure 4:
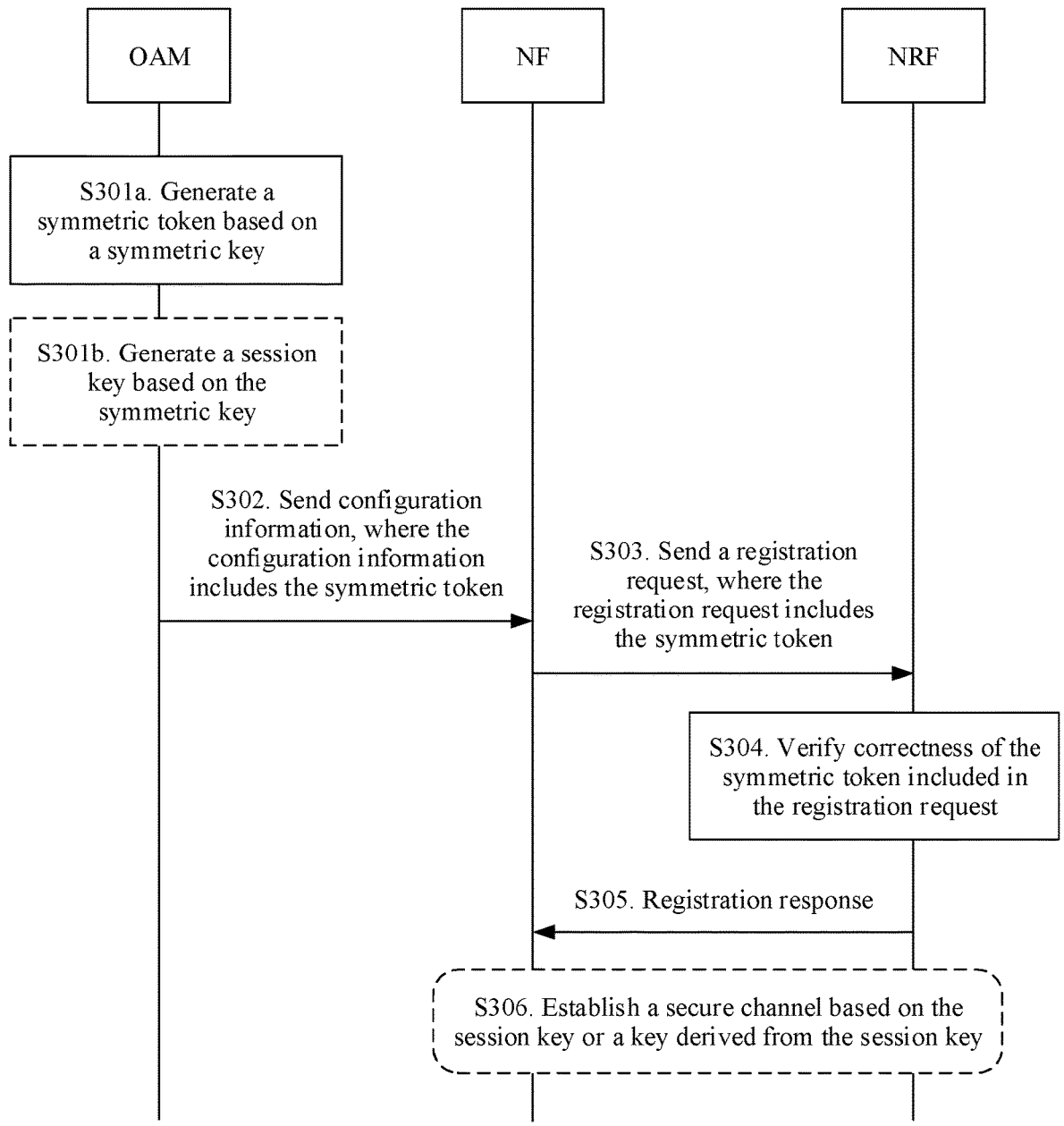
FIG. 4 is an implementation flowchart of security registration based on a service-based architecture according to Embodiment 2 of this application.

FIG. 4 is an implementation flowchart of a security registration method according to Embodiment 2 of this application. The implementation flowchart of the security registration method shown in FIG. 4 is similar to the implementation procedure of the security registration method shown in FIG. 3. A difference lies only in manners of calculating the tokens. The following describes only the difference. For same or similar parts, refer to the descriptions in Embodiment 1.

Operation S301a. The OAM generates a symmetric token.

In this embodiment of this application, the OAM may generate the symmetric token based on a symmetric key (k) shared between the OAM and the NRF.

When the OAM generates the symmetric token based on the symmetric key (k) shared between the OAM and the NRF, the OAM and the NRF need to separately pre-store the symmetric key.

Specifically, the OAM may generate the symmetric token by encrypting an MAC, an NF profile, and an ID_NF based on the symmetric key (k) shared between the OAM and the NRF. The MAC may be generated by the OAM by performing a message authentication code algorithm on the ID_NF and the NF profile based on the symmetric key (k) shared between the OAM and the NRF.

In a possible example, in addition to the MAC, the NF profile, and the ID_NF, parameters encrypted by the OAM based on the symmetric key (k) shared between the OAM and the NRF may further include one or more of an ID_NRF, an NF type, a PLMN ID, an identifier of a service supported by the NF, and the like, and at least one of a time, a nonce_token, a counter, and a sequence number.

Similarly, when the OAM generates the MAC, in addition to the ID_NF and the NF profile, parameters for performing the message authentication code algorithm based on the symmetric key (k) shared between the OAM and the NRF may further include one or more of the ID_NRF, the NF type, the PLMN ID, the identifier of the service supported by the NF, and the like, and at least one of a time, a random number of the MAC (nonce_mac), a counter, and a sequence number. In other words, content protected by the MAC may include the NF profile, the ID_NF, and a shared key between the NF and the NRF, and may further include the ID_NRF, the NF type, the PLMN ID, the identifier of the service supported by the NF, the time, the nonce_mac, the counter, the sequence number, and the like. In the content protected by the MAC, the ID_NRF is an optional parameter, the NF profile is an optional parameter, the NF type is an optional parameter, the PLMN ID is an optional parameter, and the identifier of the service supported by the NF is an optional parameter.

Operation S301b. The OAM generates a K_session.

In this embodiment of this application, the operation of generating the K_session by the OAM is an optional operation. For a specific process of generating the K_session, refer to related descriptions in Embodiment 1. Details are not described herein again.

In this embodiment of this application, if the OAM generates the K_session, the K_session may be used as a shared key between the NF and the NRF. In the foregoing process of generating the symmetric token, in addition to the foregoing related parameters, the OAM may further encrypt the K_session based on the symmetric key (k) shared between the OAM and the NRF. In addition to performing the message authentication code algorithm on the foregoing involved parameters, the OAM may further perform a message authentication code algorithm on the K_session.

Operation S302. The OAM determines configuration information, and sends the configuration information to the NF, where the configuration information includes the foregoing generated symmetric token.

In this embodiment of this application, the configuration information determined by the OAM and sent to the NF may further include the ID_NF and the token, and may further include at least one of the ID_NRF, the K_session, the NF profile, the NF type, and the like.

Operation S303. The NF receives the configuration information sent by the OAM, and sends a registration request to the NRF based on the configuration information, where the registration request includes the symmetric token that is included in the configuration information, and may also include at least one of the ID_NF, the ID_NRF, the NF profile, the NF type, and the like.

Operation S304. The NRF receives the registration request sent by the NF, and verifies correctness of the symmetric token included in the registration request.

Specifically, the NRF may decrypt the symmetric token included in the registration request using the symmetric key (k) shared between the OAM and the NRF, to obtain the MAC, and then verify correctness of the MAC using the symmetric key (k) shared between the OAM and the NRF and the content protected by the MAC. If the NRF verifies that the MAC is correct, the NRF determines that the symmetric token sent by the NF is correct, the registration request sent by the NF is valid, and the NF is authorized by the OAM. In this case, the NRF adds the NF to an NF topology based on the registration request sent by the NF, and stores registration information of the NF. If the NRF verifies that the MAC is incorrect, the NRF determines that the symmetric token sent by the NF is incorrect, the registration request sent by the NF is invalid, and the NF is not authorized by the OAM. In this case, the NRF rejects the registration request of the NF.

In a possible example, if the NRF may further decrypt, using k, the symmetric token included in the registration request, to obtain the K_session, the NF and the NRF share the K_session.

Execution operations of S305 and S306 are similar to the execution operations of S205 and S206 in Embodiment 1, and details are not described herein again.

In the foregoing embodiment of this application, the OAM generates the symmetric token based on the symmetric key (k) shared between the OAM and the NRF, and adds the symmetric token to the configuration information sent by the OAM to the NF. The NF adds the symmetric token to the registration request, and sends the registration request to the NRF. After receiving the registration request, the NRF may determine, by verifying correctness of the symmetric token included in the registration request, validity of the registration request sent by the NF, to authenticate the NF.

Further, the NF and the NRF may share the K_session, and perform security communication or authentication between the NF and the NRF using the shared K_session.

Embodiment 3: The security parameter includes an MAC.

Figure 5:
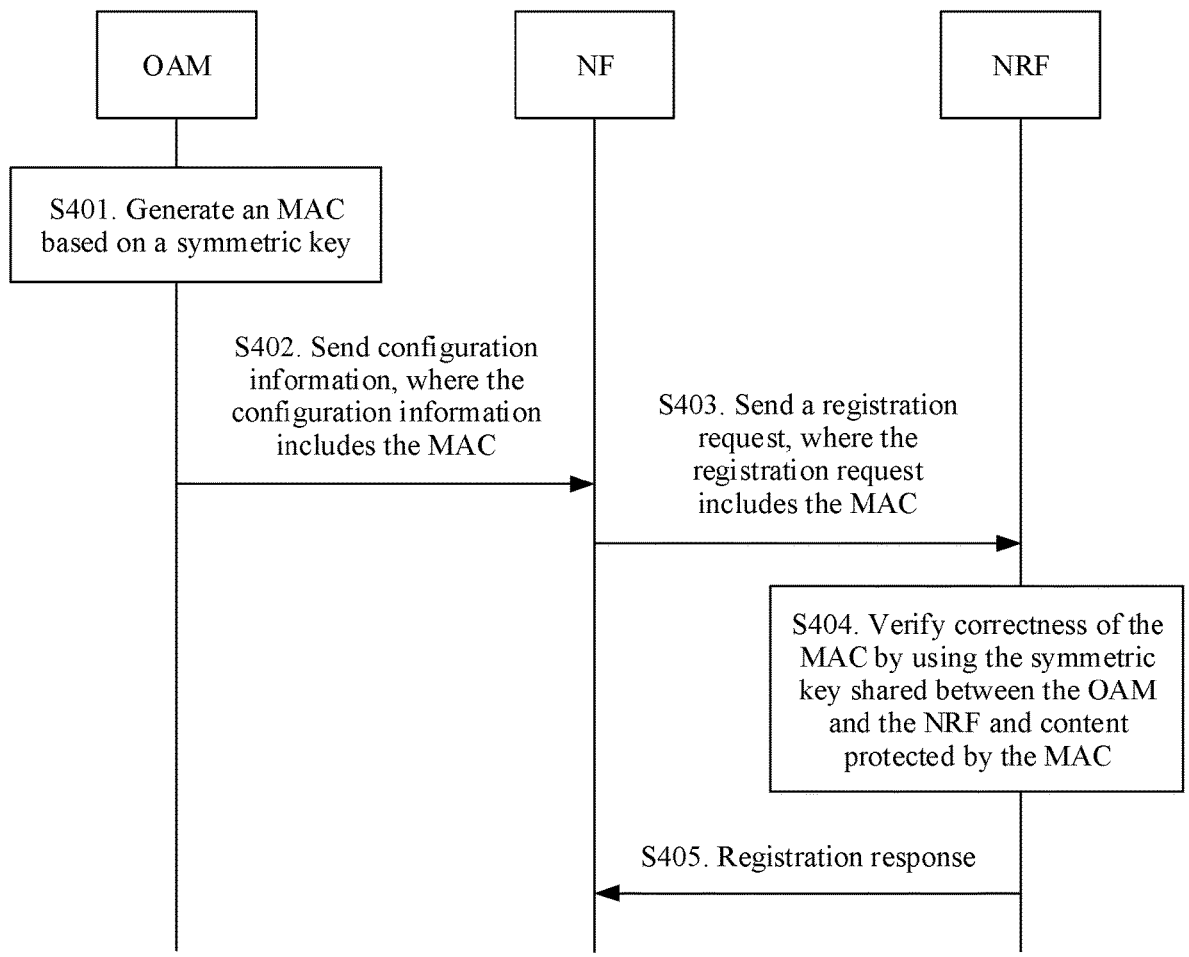
FIG. 5 is an implementation flowchart of security registration based on a service-based architecture according to Embodiment 3 of this application.

FIG. 5 is an implementation flowchart of a security registration method according to Embodiment 3 of this application. The implementation flowchart of the security registration method shown in FIG. 5 is similar to the implementation procedure of the security registration method shown in FIG. 4. Differences lie only in that the security parameter generated by the OAM is the MAC, and no token needs to be generated; and the NRF verifies only the MAC, and no token needs to be verified. The following describes only the differences. For same or similar parts, refer to related descriptions in Embodiment 2.

Operation S401. The OAM generates an MAC.

In this embodiment of this application, the OAM may generate the MAC based on a symmetric key (k) shared between the OAM and the NRF.

When the OAM generates the MAC based on the symmetric key (k) shared between the OAM and the NRF, the OAM and the NRF need to separately pre-store the symmetric key.

Specifically, in this embodiment of this application, the OAM may perform a message authentication code algorithm on an ID_NF based on the symmetric key (k) shared between the OAM and the NRF, to generate the MAC.

In one embodiment, when the OAM generates the MAC, in addition to the ID_NF, parameters for performing the message authentication code algorithm may further include one or more of an NF profile, an ID_NRF, an NF type, a PLMN ID, an identifier of a service supported by the NF, and the like, and at least one of a time, a random number of the MAC (nonce_mac), a counter, and a sequence number. In other words, content protected by the MAC may include the ID_NF, and may further include the NF profile, the ID_NRF, the NF type, the PLMN ID, the identifier of the service supported by the NF, the time, the nonce_mac, the counter, the sequence number, and the like. In the content protected by the MAC, the ID_NRF is an optional parameter, the NF profile is an optional parameter, the NF type is an optional parameter, the PLMN ID is an optional parameter, and the identifier of the service supported by the NF is an optional parameter.

Operation S402. The OAM determines configuration information, and sends the configuration information to the NF, where the configuration information includes the foregoing generated MAC.

In this embodiment of this application, in addition to the MAC, the configuration information further includes the ID_NF used when the MAC is generated. If the generated MAC includes other optional parameters such as the NF profile, the ID_NRF, the NF type, the PLMN ID, the identifier of the service supported by the NF, the time, the nonce_mac, the counter, and the sequence number, the configuration information may correspondingly include the parameters used to generate the MAC. For example, in addition to the ID_NF, if the parameters used to generate the MAC further include the ID_NRF, the configuration information sent by the OAM to the NF includes the MAC, the ID_NF, and the ID_NRF. The ID_NRF may be identification information of the NRF, or may be address information of the NRF.

Further, if the parameters used to generate the MAC are not shared between the OAM and the NRF, the shared parameters such as the time or the nonce_mac, or the non-shared counter or sequence number, need to be sent.

Further, if the parameters used to generate the MAC are shared between the OAM and the NRF, the shared parameters does not need to be sent. For example, if the OAM and the NRF share the counter and/or the sequence number, and the counter and/or the sequence number are included when the MAC is generated, the configured parameters do not need to include the counter and/or the sequence number.

Operation S403. The NF receives the configuration information sent by the OAM, and sends a registration request to the NRF based on the configuration information. The registration request includes parameter information included in the configuration information, for example, the MAC and the ID_NF, and may further include at least one of the ID_NRF, the NF profile, the NF type, the PLMN ID, the identifier of the service supported by the NF. Further, the parameters used to calculate the MAC, and the parameters that are not shared between the OAM and the NRF all need to be sent to the NRF. For example, the received time, nonce_mac, counter, or sequence number also needs to be sent to the NRF.

Operation S404. The NRF receives the registration request sent by the NF, and verifies correctness of the MAC included in the registration request.

Specifically, the NRF may verify the correctness of the MAC using the symmetric key (k) shared between the OAM and the NRF and the content protected by the MAC. If the NRF verifies that the MAC is correct, the NRF determines that the registration request sent by the NF is valid and the NF is authorized by the OAM. In this case, the NRF adds the NF to an NF topology based on the registration request sent by the NF, and stores registration information of the NF. If the NRF verifies that the MAC is incorrect, the NRF determines that the registration request sent by the NF is invalid and the NF is not authorized by the OAM. In this case, the NRF rejects the registration request of the NF.

Operation S405. The NRF sends a registration response to the NF, to notify the NF whether the NF is successfully registered.

In Embodiment 3 of this application, the OAM generates the MAC based on the symmetric key (k) shared between the OAM and the NRF, and adds the MAC to the configuration information sent by the OAM to the NF. The NF adds the MAC to the registration request, and sends the registration request to the NRF. After receiving the registration request, the NRF may determine, by verifying the correctness of the MAC included in the registration request, validity of the registration request sent by the NF, to authenticate the NF.

In Embodiment 3 of this application, the NRF authenticates the NF. In a possible embodiment, the NF may also authenticate the NRF. In other words, two-way authentication between the NF and the NRF is implemented. In this embodiment of this application, the following describes, with reference to Embodiment 4 and Embodiment 5, a process that the NF and the NRF implement two-way authentication.

Embodiment 4: Two-way authentication between the NF and the NRF is implemented based on an MAC.

Figure 6:
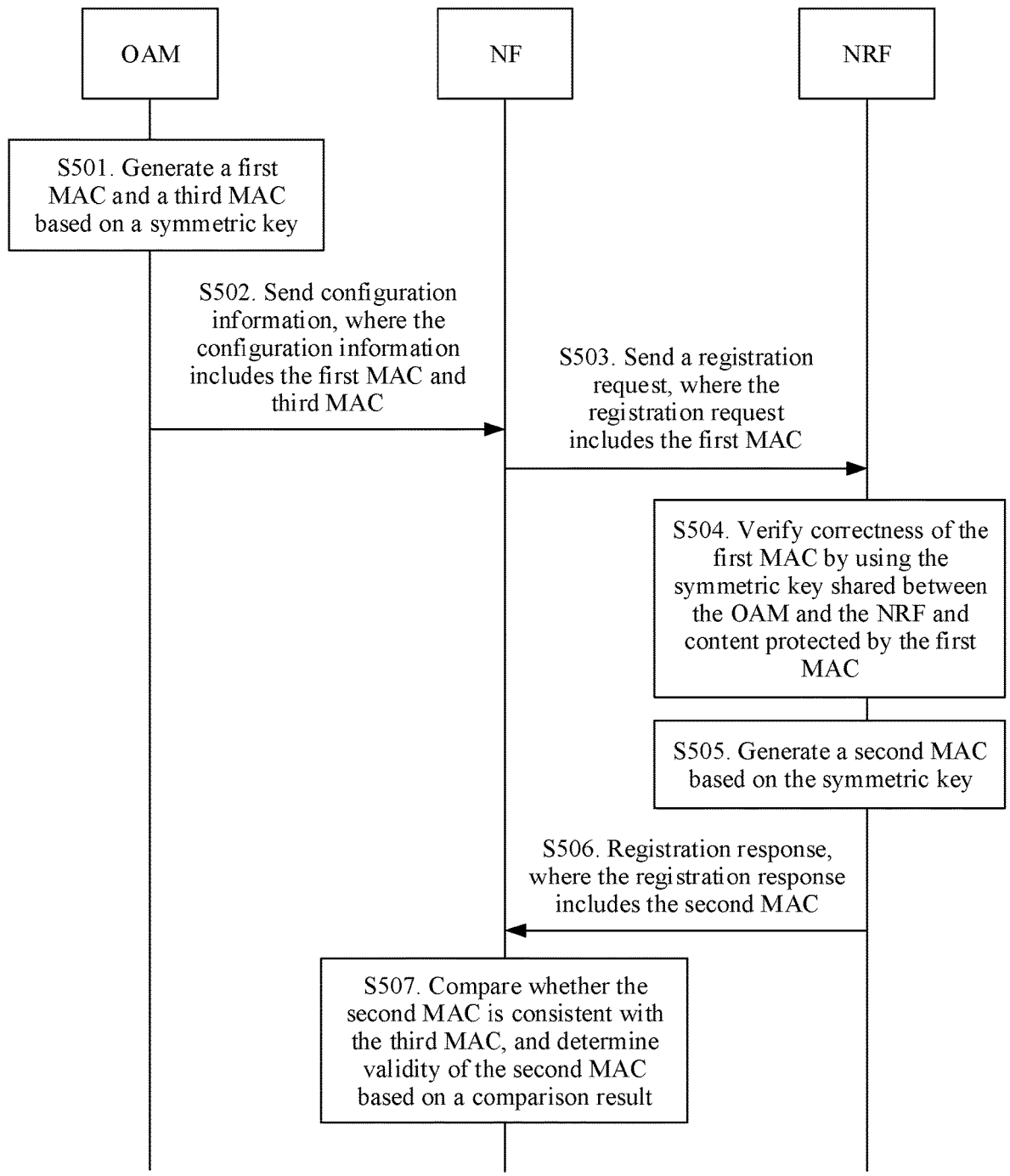
FIG. 6 is an implementation flowchart of security registration based on a service-based architecture according to Embodiment 4 of this application.

FIG. 6 is an implementation flowchart of a security registration method according to Embodiment 4 of this application. In the security registration method shown in FIG. 6, based on the security registration method in Embodiment 4, the NRF and the OAM separately generate another MAC. By comparing whether the MAC generated by the OAM is consistent with the MAC generated by the NRF, the two-way authentication between the NF and the NRF is implemented.

For ease of description, in this embodiment of this application, the MAC generated by the OAM in Embodiment 3 is referred to as a first MAC, the MAC generated by the NRF in Embodiment 4 of this application is referred to as a second MAC, and the MAC generated by the OAM in this embodiment of this application is referred to as a third MAC.

Execution operations of S501, S502, S503, and S504 in FIG. 6 are similar to the execution operations of S401, S402, S403, and S404 in FIG. 5, and a difference lies in that in operation S501, the OAM generates the third MAC in addition to the first MAC. In this embodiment of this application, a part that is the same as that in Embodiment 3 is not described herein again, and only the difference is described below.

Operation S501. The OAM generates the first MAC and the third MAC.

The OAM may generate the third MAC based on a symmetric key (k) shared between the OAM and the NRF.

Specifically, in this embodiment of this application, the OAM may perform a message authentication code algorithm on an ID_NF and an ID_NRF based on the symmetric key (k) shared between the OAM and the NRF, to generate the third MAC.

In one embodiment, when the OAM generates the third MAC, in addition to the ID_NF and the ID_NRF, parameters for performing the message authentication code algorithm based on the symmetric key (k) shared between the OAM and the NRF may further include one or more of an NF profile, an NF type, a PLMN ID, an identifier of a service supported by the NF, and the like, and at least one of a time, a random number (nonce_mac3) of the MAC3, a counter, and a sequence number. In other words, content protected by the third MAC may include the ID_NF and the ID_NRF, and may further include the NF profile, the NF type, the PLMN ID, the identifier of the service supported by the NF, the time, the nonce_mac3, the counter, the sequence number, and the like. In the content protected by the third MAC, the NF profile is an optional parameter, the NF type is an optional parameter, the PLMN ID is an optional parameter, and the identifier of the service supported by the NF is an optional parameter.

Operation S502. The OAM determines configuration information, and sends the configuration information to the NF, where the configuration information includes the foregoing generated first MAC and third MAC.

Execution operations of S503 and S504 are the same as the execution operations of S403 and S404.

Further, if parameters not shared between the OAM and the NRF are used when the third MAC is generated, all of the parameters need to be sent to the NRF. For example, at least one of the received time, nonce_mac3, counter, or sequence number also needs to be sent to the NRF through the NF.

Operation S505. The NRF generates the second MAC.

In this embodiment of this application, the NRF may generate the second MAC based on the symmetric key (k) shared between the OAM and the NRF.

Specifically, in this embodiment of this application, the NRF may perform a message authentication code algorithm on the ID_NF and the ID_NRF based on the symmetric key (k) shared between the OAM and the NRF, to generate the second MAC.

Parameters used in a process of generating the second MAC by the NRF in this embodiment of this application are the same as the parameters used in the process of generating the third MAC by the OAM. Details are not described herein again.

Operation S506. The NRF sends the second MAC to the NF. The second MAC may be sent using a registration response sent by the NRF to the NF.

Operation S507. The NF receives the second MAC sent by the NRF, compares whether the second MAC is consistent with the third MAC, and determines validity of the second MAC based on a comparison result.

In this embodiment of this application, if the second MAC is consistent with the third MAC, the NF determines that the second MAC is valid, and determines that the NRF can be authenticated.

In this embodiment of this application, the NRF verifies the first MAC, to authenticate the NF, and the NF compares whether the second MAC is consistent with the third MAC, to authenticate the NRF, thereby implementing mutual authentication between the NF and the NRF.

Embodiment 5: Two-way authentication between the NF and the NRF is implemented based on an MAC.

Figure 7:
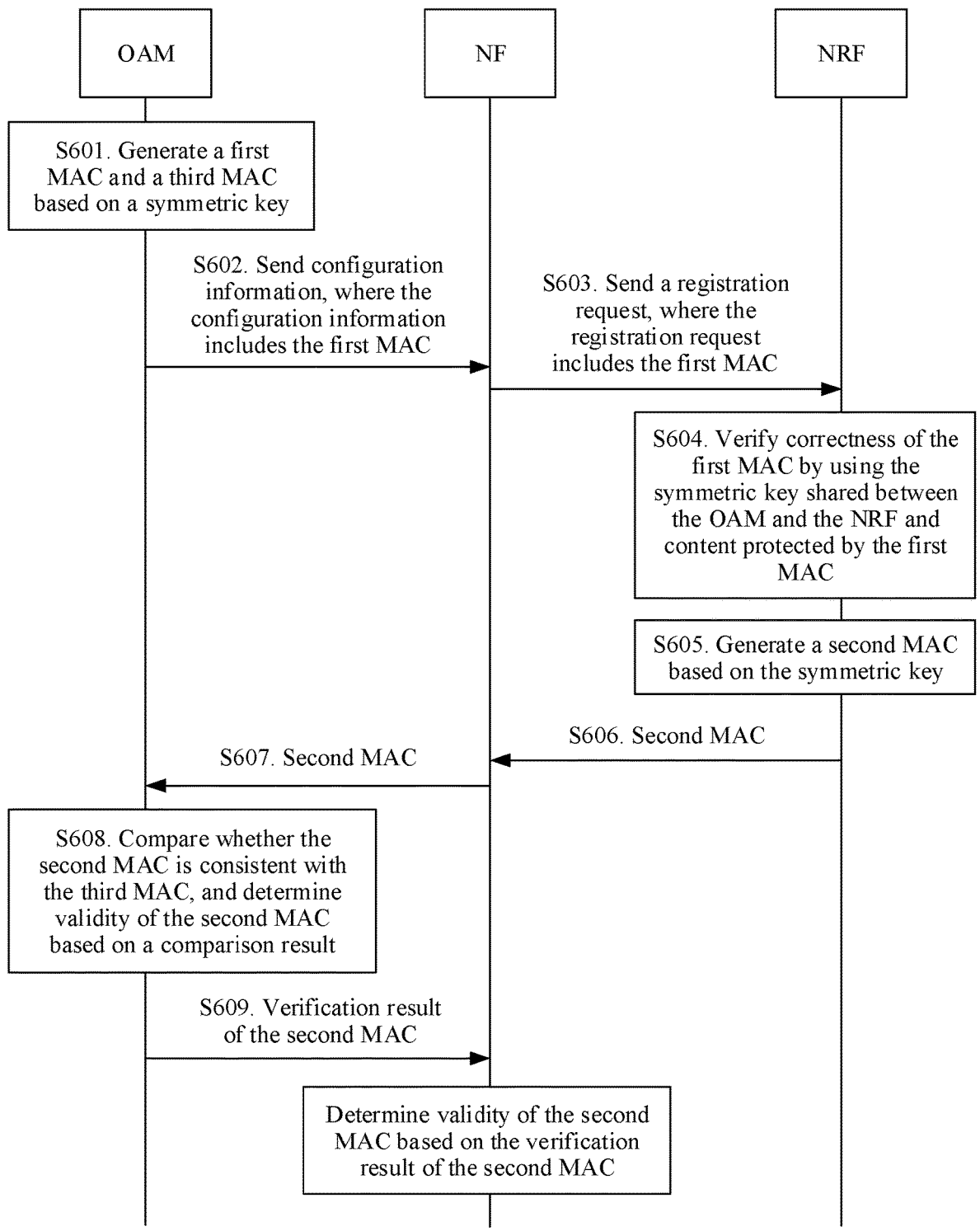
FIG. 7 is an implementation flowchart of security registration based on a service-based architecture according to Embodiment 5 of this application.

FIG. 7 is an implementation flowchart of a security registration method according to Embodiment 5 of this application. Execution operations of S601, S603, S604, S605, and S606 in FIG. 7 are the same as the execution operations of S501, S503, S504, S505, and S506 in FIG. 6. An execution operation of S602 in FIG. 7 is the same as the execution operation of S402 in FIG. 5.

Operation S607. The NF receives the second MAC sent by the NRF, and sends the second MAC to the OAM.

Operation S608. The OAM receives the second MAC sent by the NF, compares whether the second MAC is consistent with the third MAC, and determines a verification result of the second MAC based on a comparison result.

In this embodiment of this application, if the second MAC is consistent with the third MAC, the NF determines that the second MAC is valid, and determines that the NRF can be authenticated.

Operation S609. The OAM sends the verification result of the second MAC to the NF, and the NF determines validity of the second MAC based on the verification result that is of the second MAC and that is received from the OAM.

In this embodiment of this application, the NRF verifies the first MAC, to authenticate the NF, and the NF determines validity of the second MAC based on the verification result that is of the second MAC and that is received from the OAM, to authenticate the NRF, thereby implementing mutual authentication between the NF and the NRF.

Embodiment 6: The security parameter includes a digital signature.

Figure 8:
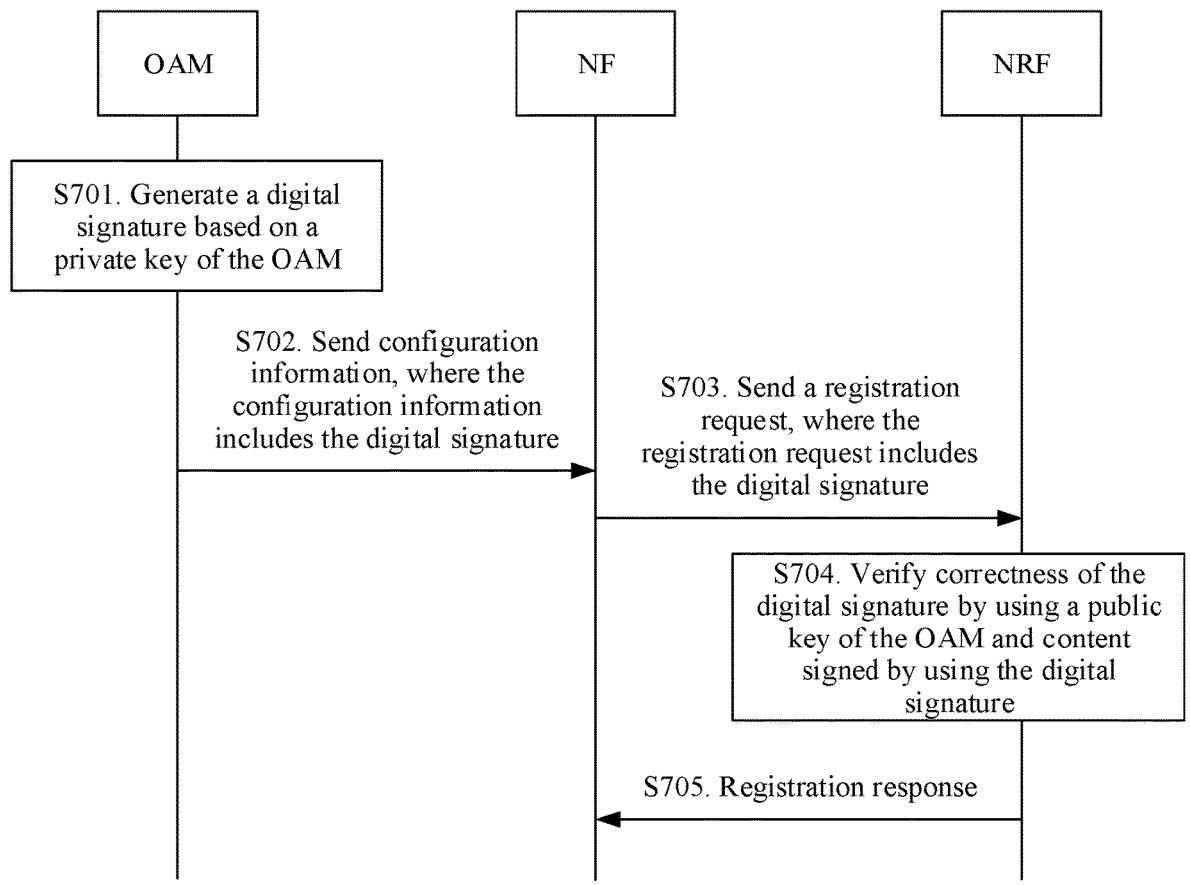
FIG. 8 is an implementation flowchart of security registration based on a service-based architecture according to Embodiment 6 of this application.

FIG. 8 is an implementation flowchart of a security registration method according to Embodiment 6 of this application. The implementation flowchart of the security registration method shown in FIG. 8 is similar to the implementation procedure of the security registration method shown in FIG. 5. A difference lies only in that the security parameter generated by the OAM is a digital signature rather than an MAC. The following describes only the difference. For same or similar parts, refer to related descriptions in Embodiment 3.

Operation S701. The OAM generates a digital signature.

In this embodiment of this application, the OAM may generate the digital signature based on an SKoam.

When the OAM generates the digital signature based on the SKoam, the OAM needs to prestore a PKoam and the SKoam, and the NRF also needs to pre-store the PKoam. The PKoam may be initially preset in the NRF, or may be sent by the OAM to the NRF during interaction between the OAM and the NRF.

Specifically, in this embodiment of this application, parameters (signed content) used when the digital signature algorithm is performed by the OAM based on the SKoam in the digital signature generation process is similar to the parameters (the content protected by the MAC) used when the message authentication code algorithm is performed in the MAC generation process in Embodiment 3, and a difference lies only in that a random number used in the digital signature process is a random number of the digital signature. Same parts are not described herein again.

Operation S702. The OAM determines configuration information, and sends the configuration information to the NF, where the configuration information includes the foregoing generated digital signature.

Further, if parameters not shared between the OAM and the NRF are used when the digital signature is generated, all of the parameters need to be sent to the NRF. For example, at least one of the received time, nonce_sign, counter, or sequence number also needs to be sent to the NRF through the NF.

Operation S703. The NF receives the configuration information sent by the OAM, and sends a registration request to the NRF based on the configuration information, where the registration request includes the digital signature generated by the OAM and sent to the NF.

Operation S704. The NRF receives the registration request sent by the NF, and verifies correctness of the digital signature included in the registration request.

Specifically, the NRF may verify the correctness of the digital signature using the prestored PKoam and the signed content. If the NRF determines that the digital signature sent by the NF is correct, the registration request sent by the NF is valid, and the NF is authorized by the OAM. In this case, the NRF adds the NF to an NF topology based on the registration request sent by the NF, and stores registration information of the NF. If the NRF determines that the digital signature sent by the NF is incorrect, the registration request sent by the NF is invalid, and the NF is not authorized by the OAM. In this case, and the NRF rejects the registration request of the NF.

Operation S705. The NRF sends a registration response to the NF, to notify the NF whether the NF is successfully registered.

In Embodiment 6 of this application, the OAM generates the digital signature based on the SKoam, and adds the digital signature to the configuration information sent by the OAM to the NF. The NF adds the digital signature to the registration request, and sends the registration request to the NRF. After receiving the registration request, the NRF may determine, by verifying the correctness of the digital signature included in the registration request, validity of the registration request sent by the NF, to authenticate the NF.

In Embodiment 6 of this application, the NRF authenticates the NF based on the digital signature. In a possible embodiment, the NF may also authenticate the NRF based on the digital signature. In other words, two-way authentication between the NF and the NRF is implemented based on the digital signature. In this embodiment of this application, the following describes, with reference to Embodiment 7, a process that the NF and the NRF implement the two-way authentication based on the digital signature.

Embodiment 7: The NF and the NRF perform two-way authentication based on a digital signature.

In this embodiment of this application, to implement the two-way authentication between the NF and the NRF based on the digital signature, based on the security registration method in Embodiment 6, the NRF may generate another digital signature. The NF verifies the digital signature generated by the NRF, to authenticate the NRF. Specific parameters for generating the digital signature are consistent with the parameters for calculating the MAC in S605 in the embodiment corresponding to FIG. 7.

For ease of description, in this embodiment of this application, the digital signature generated by the OAM in Embodiment 6 may be referred to as a first digital signature, and the digital signature generated by the NRF in Embodiment 7 may be referred to as a second digital signature.

Figure 9:
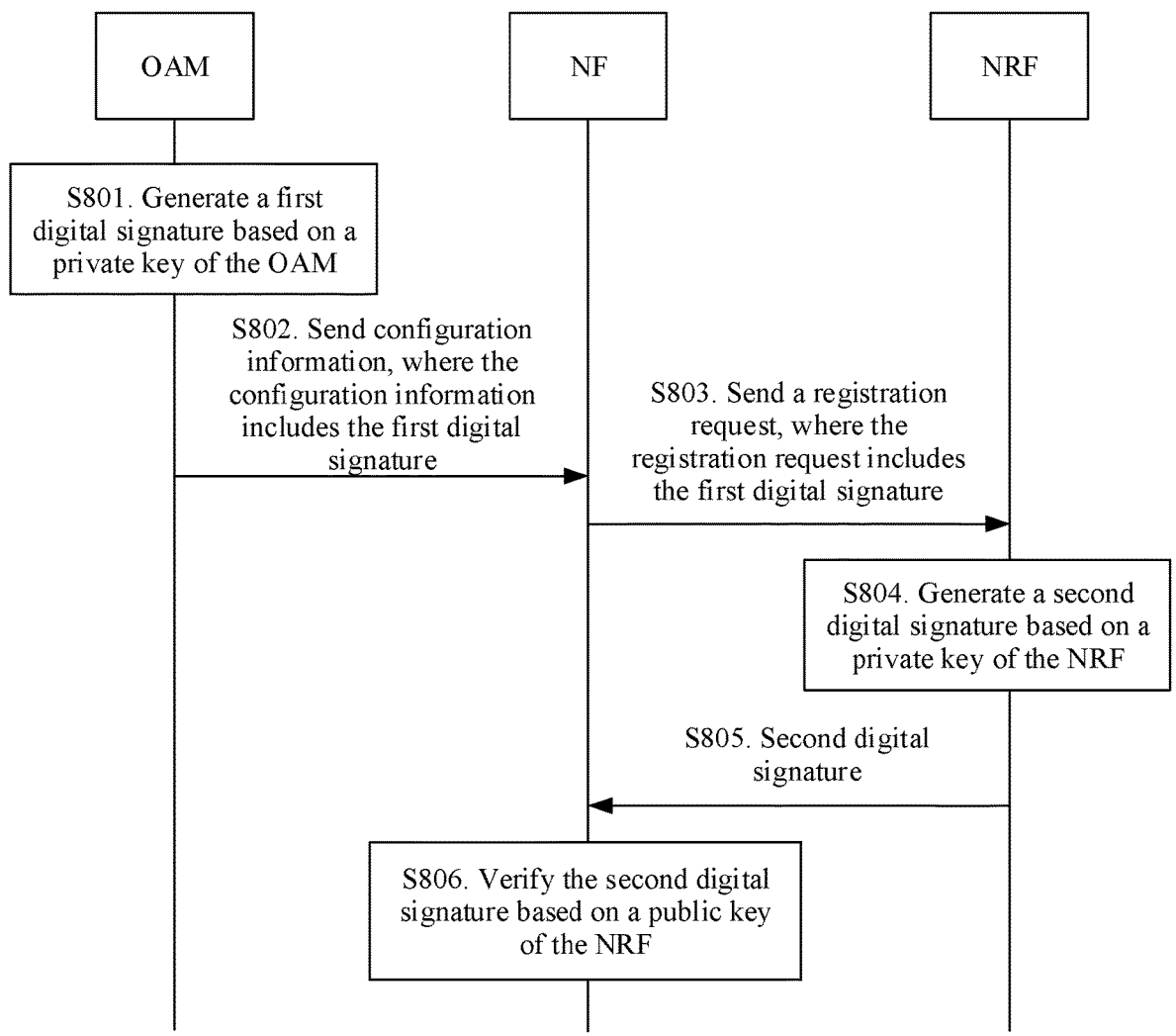
FIG. 9 is an implementation flowchart of security registration based on a service-based architecture according to Embodiment 7 of this application.

FIG. 9 is an implementation flowchart of a security registration method according to Embodiment 7 of this application. Execution operations of S801, S802, and S803 in the implementation procedure of the security registration method shown in FIG. 9 are similar to execution operations of S701, S702, and S703 involved in the implementation procedure of the security registration method shown in FIG. 8, provided that the digital signature in FIG. 8 needs to be replaced with the first digital signature. Therefore, same parts are not described herein again, and only differences are described below.

Operation S804. The NRF generates a second digital signature.

In this embodiment of this application, the NRF may generate the second digital signature based on an SKnrf.

Specifically, in this embodiment of this application, parameters (signed content) used when the digital signature algorithm is performed by the NRF based on the SKnrf in the process of generating the second digital signature are similar to the parameters (content protected by the second MAC) used when the message authentication code algorithm is performed in the process of generating the second MAC in Embodiment 4, and a difference lies only in that the random number used in the digital signature process is a random number of the digital signature. Same parts are not described herein again.

Operation S805. The NRF sends the second digital signature to the NF, and the second digital signature may be sent using a registration response sent by the NRF to the NF.

Operation S806. The NF verifies the second digital signature sent by the NRF.

Specifically, the NF may verify correctness of the second digital signature using a prestored PKnrf. The PKnrf may be initially preset in the NF, or may be obtained from the NRF in a process in which the NF interacts with the NRF.

In this embodiment of this application, the NF may verify the correctness of the second digital signature using the PKnrf and content signed using the second digital signature. If the second digital signature is verified to be correct, the NR verifies that the NRF is valid. If the second digital signature is verified to be incorrect, the NR verifies that the NRF is invalid.

In this embodiment of this application, the NRF verifies the first digital signature, to authenticate the NF, and the NF verifies the second digital signature, to authenticate the NRF, thereby implementing mutual authentication between the NF and the NRF based on the digital signature.

Embodiment 8: The security parameter includes an MAC generated by the NF, and the NRF verifies correctness of the MAC generated by the NF.

Figure 10A:
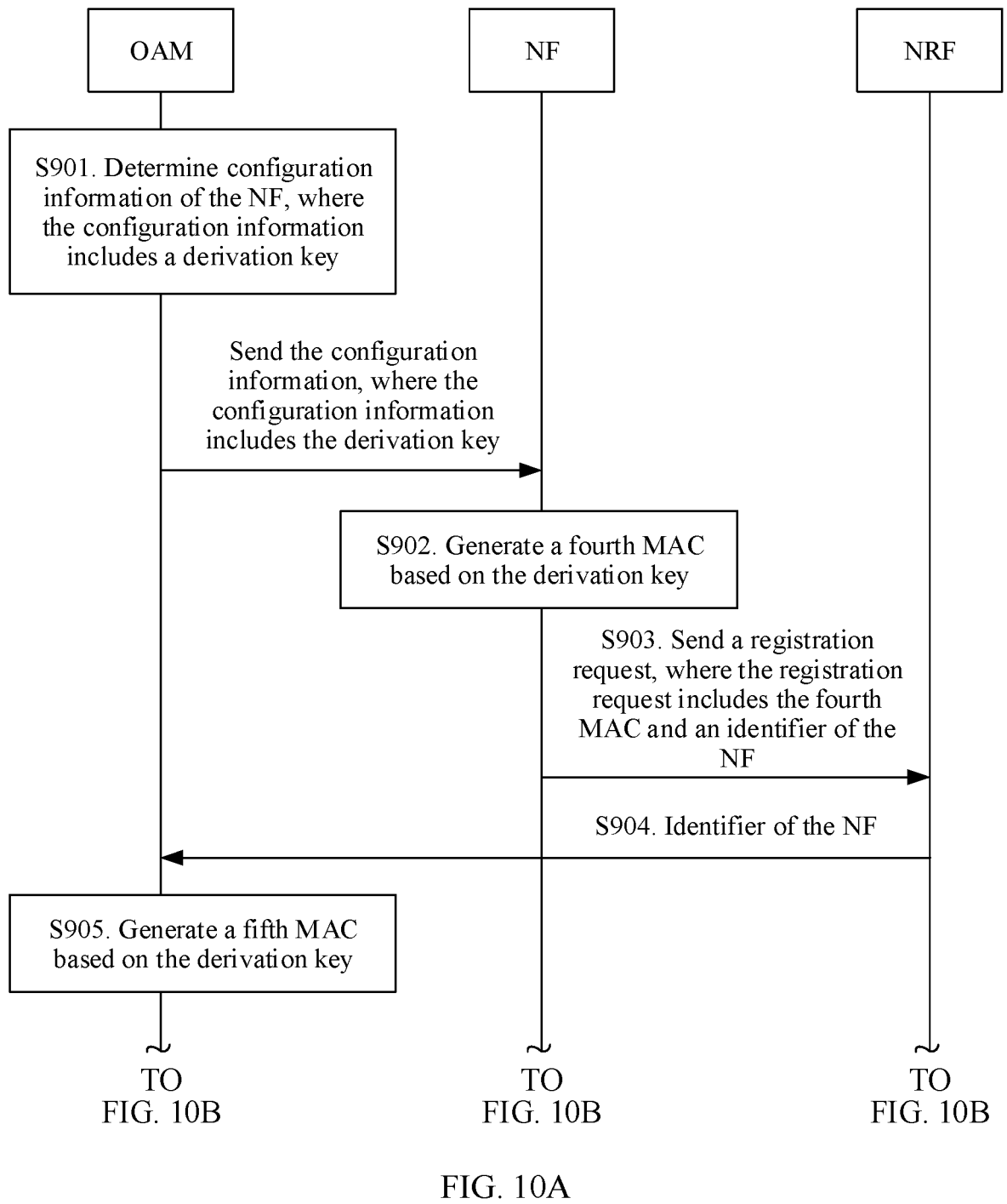
FIG. 10A and FIG. 10B are an implementation flowchart of security registration based on a service-based architecture according to Embodiment 8 of this application.
Figure 10B:
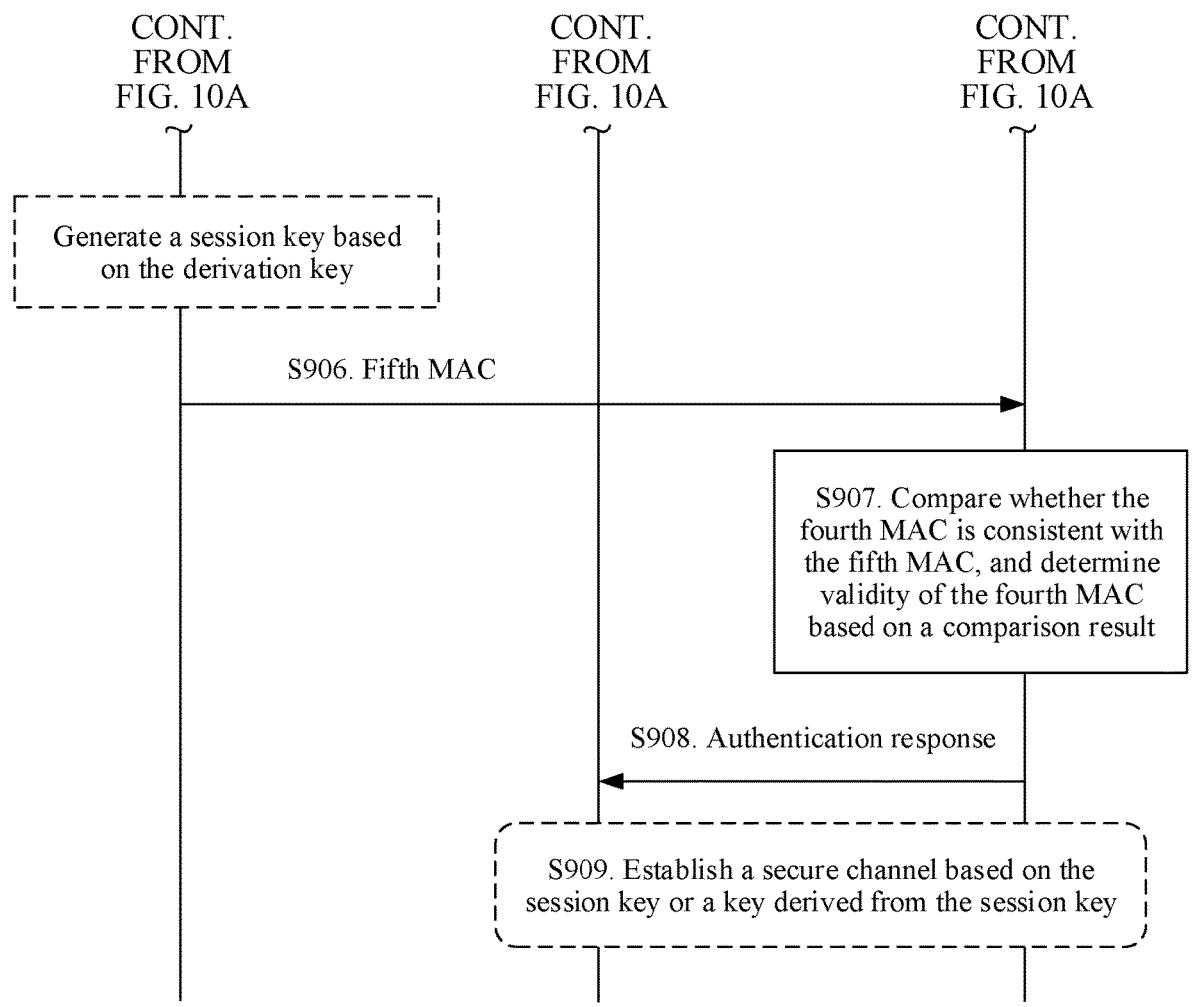

FIG. 10A and FIG. 10B are an implementation flowchart of a security registration method according to Embodiment 8 of this application. Referring to FIG. 10A and FIG. 10B, the method includes the following operations.

Operation S901. The OAM determines configuration information of the NF, and sends the determined configuration information to the NF, where the configuration information includes a derivation key (K_NF).

In this embodiment of this application, the OAM may perform key derivation on a preset root key to obtain the derivation key (K_NF), or the OAM stores the preconfigured derivation key (K_NF).

Specifically, the OAM may perform a key derivation algorithm on the preset root key, an ID_NF, and a PLMN ID, to obtain the derivation key (K_NF).

Operation S902. The NF receives the configuration information sent by the OAM, and generates an MAC using the derivation key (K_NF) included in the configuration information.

In this embodiment of this application, for ease of description, a message authentication code generated by the NF based on the derivation key (K_NF) is referred to as a fourth MAC.

In this embodiment of this application, the fourth MAC generated by the NF based on the derivation key (K_NF) is similar to the first MAC generated by the OAM. A difference lies only in that the NF generates the fourth MAC based on the derivation key (K_NF), and the OAM generates the first MAC based on the symmetric key (k) shared between the OAM and the NRF. For parameters for performing a message authentication code algorithm when the NF generates the fourth MAC based on the derivation key (K_NF), refer to the parameters for performing the message authentication code algorithm when the OAM generates the first MAC based on the symmetric key (k) shared between the OAM and the NRF, and details are not described herein again.

Operation S903. The NF sends a registration request to the NRF, and the registration request includes the foregoing generated fourth MAC and the ID_NF. Certainly, the registration request may further include other configuration information different from the ID_NF.

Operation S904. The NRF sends the ID_NF to the OAM.

The NRF may further send information such as a validity period (time) and nonce_mac4 of the fourth MAC to the OAM, to query MAC information of the NF that is stored in the OAM.

Operation S905. The OAM receives the ID_NF sent by the NRF, and performs a message authentication code algorithm on the ID_NF based on the pre-stored derivation key (K_NF), to obtain a MAC used by the NRF to perform authentication on the NF.

For ease of description, in this embodiment of this application, the MAC generated by the OAM based on the derivation key (K_NF) is referred to as a fifth MAC.

In this embodiment of this application, an execution process in which the OAM generates the fifth MAC based on the derivation key (K_NF) may be similar to the execution process in which the OAM generates the third MAC based on the symmetric key (k) shared between the OAM and the NRF. A difference lies only in that the fifth MAC is generated based on the derivation key (K_NF), the third MAC is generated based on the symmetric key (k) shared between the OAM and the NRF. In this embodiment of this application, for parameters for performing the message authentication code algorithm when the OAM generates the fifth MAC based on the derivation key (K_NF), refer to the parameters for performing the message authentication code algorithm when the OAM generates the third MAC based on the symmetric key (k) shared between the OAM and the NRF. Details are not described herein again.

In a possible example, if the NF and the NRF share a K_session used for security communication or authentication between the NF and the NRF, the OAM may further generate the K_session based on the derivation key (K_NF).

Operation S906. The OAM sends a fifth MAC to the NRF.

If the OAM generates the K_session based on the derivation key (K_NF), the OAM further sends the generated K_session to the NRF.

Operation S907. The NRF receives the fifth MAC sent by the OAM, compares whether the fourth MAC is consistent with the fifth MAC, to verify correctness of the fourth MAC, and determines, based on the correctness of the fourth MAC, validity of the registration request sent by the NF.

In this embodiment of this application, if the fourth MAC is consistent with the fifth MAC, the NF determines that the fourth MAC is correct, determines that the registration request sent by the NF is valid, and determines that the NF can be authenticated.

Operation S908. The NRF sends an authentication response to the NF, to notify the NF whether the authentication succeeds.

In a possible example, if the OAM generates the K_session based on the derivation key (K_NF), the NRF may perform operation S909 using the K_session.

Operation S909. When determining that the registration request sent by the NF is valid, the NRF establishes a secure channel with the NF based on the K_session or a key derived from the K_session.

In Embodiment 8 of this application, the NF generates the fourth MAC and sends the fourth MAC to the NRF. The NRF obtains the fifth MAC from the OAM through query, and compares whether the fourth MAC is consistent with the fifth MAC, to authenticate the NF.

In this embodiment of this application, after receiving the fourth MAC sent by the NF, the NRF may send the fourth MAC to the OAM. The OAM verifies the correctness of the fourth MAC, and the NRF may determine, based on a verification result that is of the fourth MAC and that is sent by the OAM, validity of the registration request sent by the NF. For a specific implementation process, refer to Embodiment 9.

Embodiment 9: The security parameter includes an MAC generated by the NF, and the OAM verifies correctness of the MAC generated by the NF.

Figure 11A:
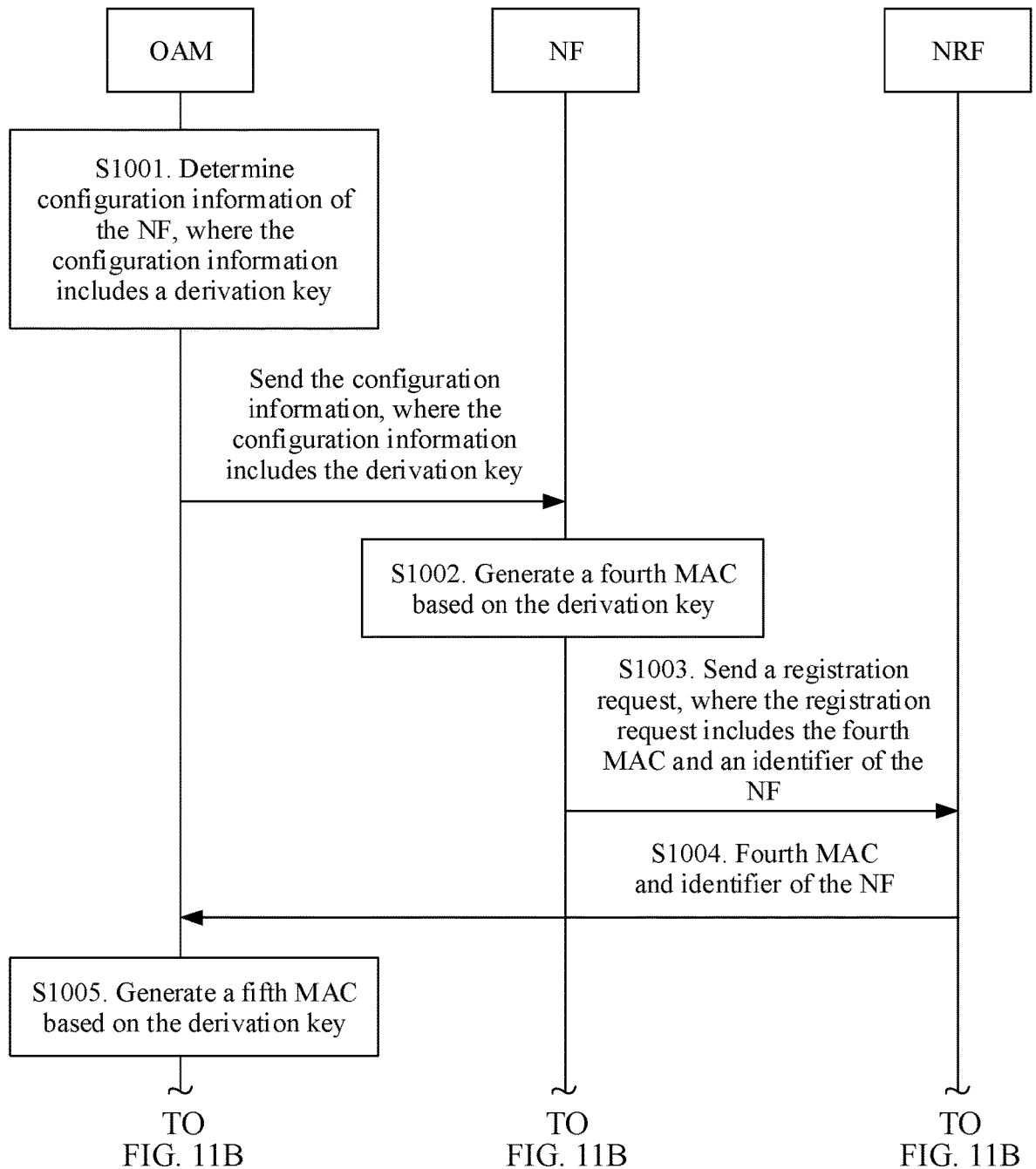
FIG. 11A and FIG. 11B are an implementation flowchart of security registration based on a service-based architecture according to Embodiment 9 of this application.
Figure 11B:
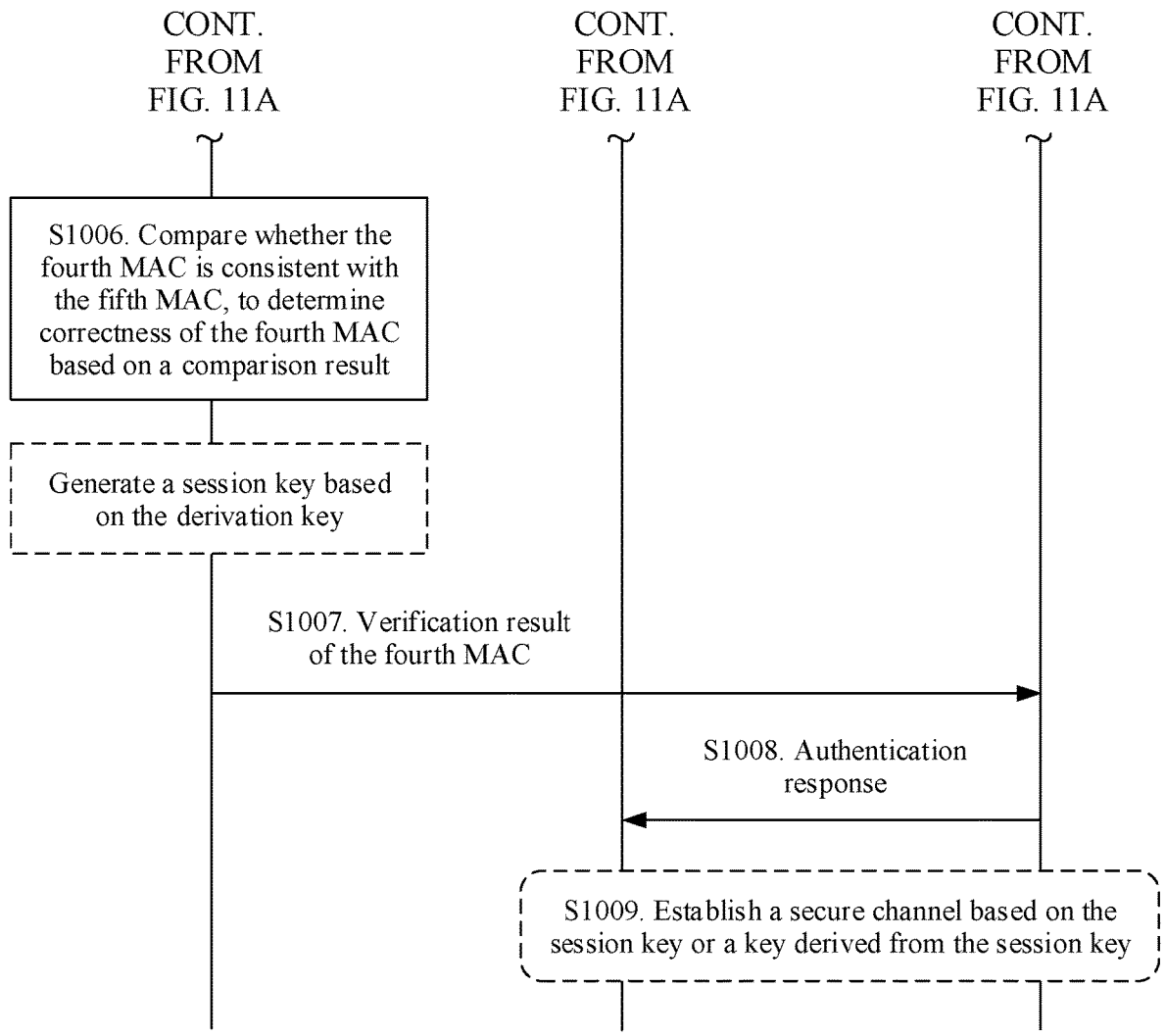

FIG. 11A and FIG. 11B are an implementation flowchart of a security registration method according to Embodiment 9 of this application. In the flowchart of the security registration method shown in FIG. 11A and FIG. 11B, execution operations of S1001, S1002, S1003, S1008, and S1009 are the same as the execution operations of S901, S902, S903, S908, and S909 in FIG. 10A and FIG. 10B, and details are not described herein again. The following describes only differences.

Operation S1004. The NRF sends the ID_NF and the fourth MAC to the OAM.

Operation S1005. The OAM receives the ID_NF and the fourth MAC that are sent by the NRF, and generates a fifth MAC based on the pre-stored derivation key (K_NF).

In a possible example, if the NF and the NRF share a K_session used for security communication or authentication between the NF and the NRF, the OAM may further generate the K_session based on the derivation key (K_NF).

Operation S1006. The OAM compares whether the fourth MAC is consistent with the fifth MAC, to verify correctness of the fourth MAC, and sends a verification result of the fourth MAC to the NRF.

In this embodiment of this application, if the fourth MAC is consistent with the fifth MAC, the NF determines that the fourth MAC is correct, determines that the registration request sent by the NF is valid, and determines that the NF can be authenticated.

Operation S1007. The NRF receives the verification result of the fourth MAC that is sent by the OAM, to determine the correctness of the fourth MAC and determine validity of the registration request sent by the NF.

In a possible example, if the OAM generates the K_session based on the derivation key (K_NF), the OAM sends the K_session to the NRF.

In Embodiment 9 of this application, the NF generates the fourth MAC and sends the fourth MAC to the NRF. The NRF sends the fourth MAC to the OAM. The OAM generates the fifth MAC, and verifies the correctness of the fourth MAC by comparing whether the fourth MAC is consistent with the fifth MAC, and sends the verification result of the fourth MAC to the NRF. The NRF determines, based on the verification result of the fourth MAC, validity of the registration request sent by the NF, to authenticate the NF.

In this embodiment of this application, the foregoing embodiment in which verification is performed using the MAC and the signature further includes a possibility that the K_session is generated based on DH (Diffie-Hellman) key negotiation. To be specific, the OAM generates a public key PK_DH_OAM and a private key SK_DH_OAM that are for the DH key negotiation, and protects the PK_DH_OAM using the MAC or the signature. In addition, the OAM sends the PK_DH_OAM and the SK_DH_OAM to the NF. In addition to sending the registration request in the foregoing embodiment, the NF additionally sends the PK_DH_OAM to the NRF. After verification on the MAC or the signature succeeds, the NRF generates the public key PK_DH_NRF and the private key SK_DH_NRF for the DH key negotiation, and generates the K_session based on the PK_DH_OAM and the SK_DH_NRF. The NRF sends the PK_DH_NRF to the NF. In this case, the NF may generate the K_session based on the PK_DH_NRF and the SK_DH_OAM. Formats of the parameters and manners of calculating the K_session are similar to those in a classic DH key negotiation procedure. This is not limited in a DH key protocol does not limit this, and includes but not limited to a discrete logarithm and the like.

In the embodiments of this application, all the foregoing embodiments using the asymmetric technology may still be implemented using an identity technology. Different from the certificate-based asymmetric security technology, a public key PK may be an ID, namely, a user identity in the identity-based technology.

The foregoing mainly describes the solutions provided in the embodiments of this application from a perspective of interaction between the management network element, the function network element, and the control network element. It can be understood that, to implement the foregoing functions, the management network element, the function network element, and the control network element include corresponding hardware structures and/or software modules for performing the functions. With reference to the units and algorithm operations described in the embodiments disclosed in this application, the embodiments of this application can be implemented in a form of hardware or a combination of hardware and computer software. Whether a function is performed by hardware or hardware driven by computer software depends on particular applications and design constraints of the technical solution. A person skilled in the art may use different methods to implement the described functions for each particular application, but it should not be considered that the implementation falls beyond the scope of the technical solutions in the embodiments of this application.

In the embodiments of this application, the management network element, the function network element, and the control network element may be divided into functional units according to the foregoing method examples. For example, various functional units may be obtained through division in correspondence to various functions, or two or more functions may be integrated into one processing unit. The integrated unit may be implemented in a form of hardware, or may be implemented in a form of a software functional unit. It should be noted that, in the embodiments of this application, the division into units is an example, and is merely a logical function division. In actual implementation, another division manner may be used.

Figure 12:
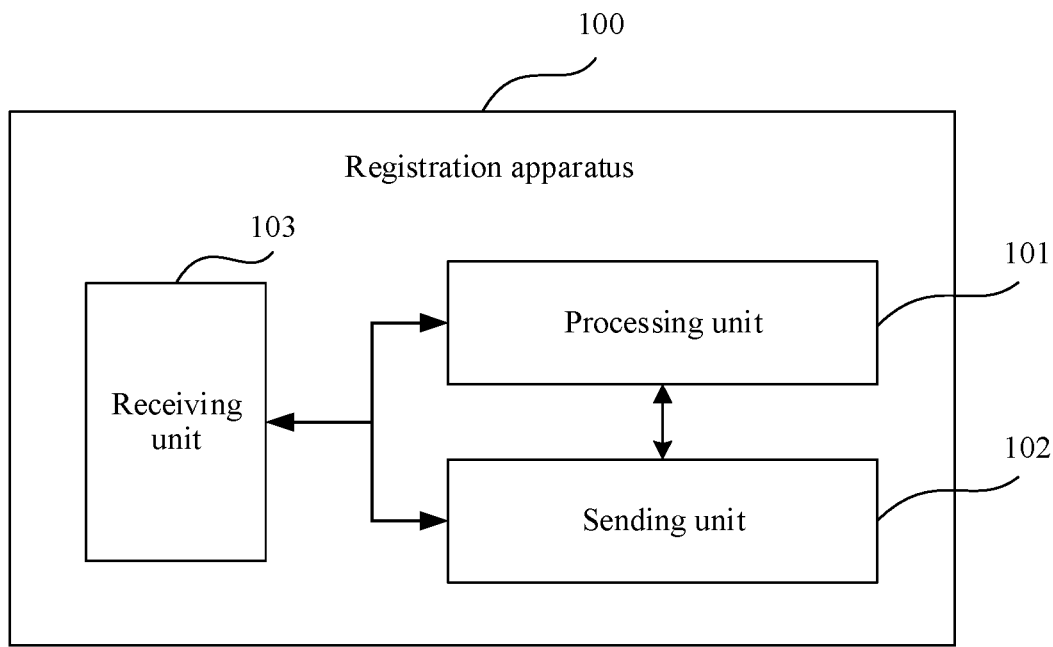
FIG. 12 is a schematic structural diagram of a registration apparatus applied to a management network element according to an embodiment of this application.

When a form of a software functional unit is used for implementation, FIG. 12 is a schematic structural diagram of a registration apparatus 100 based on a service-based architecture according to an embodiment of this application. The registration apparatus 100 based on a service-based architecture may be applied to a management network element. Referring to FIG. 12, the registration apparatus 100 applied to the management network element may include a processing unit 101 and a sending unit 102. The processing unit 101 is configured to determine configuration information of a function network element, and generate a security parameter. The sending unit 102 is configured to send the configuration information determined by the processing unit 101 to the function network element, where the sent configuration information includes the generated security parameter.

In one embodiment, the processing unit 101 may perform a digital signature algorithm on a function network element profile and an identifier of the function network element based on a private key of the management network element to generate a digital signature, and encrypt the digital signature, the function network element profile, and the identifier of the function network element based on a public key of the control network element to generate an asymmetric token. The sending unit 102 sends the asymmetric token generated by the processing unit 101 as the security parameter to the function network element.

Alternatively, the processing unit 101 may perform, based on a private key of the management network element, a digital signature algorithm on a function network element profile, an identifier of the function network element, and a shared key between the function network element and the control network element to generate a digital signature, and encrypt the digital signature, the function network element profile, the identifier of the function network element, and the shared key between the function network element and the control network element based on a public key of the control network element to generate an asymmetric token. The sending unit 102 sends the asymmetric token generated by the processing unit 101 as the security parameter to the function network element.

In another embodiment, the processing unit 101 may perform, based on a symmetric key shared between the management network element and the control network element, a message authentication code algorithm on an identifier of the function network element and a function network element profile to generate a message authentication code, and encrypt, based on the symmetric key shared between the management network element and the control network element, the message authentication code, the function network element profile, and the identifier of the function network element to generate a symmetric token. The sending unit 102 sends the symmetric token generated by the processing unit 101 as the security parameter to the function network element.

Alternatively, the processing unit 101 may perform, based on a symmetric key shared between the management network element and the control network element, a message authentication code algorithm on a shared key between the function network element and the control network element, an identifier of the function network element, and a function network element profile to generate a message authentication code, and encrypt, based on the symmetric key shared between the management network element and the control network element, the message authentication code, the function network element profile, the identifier of the function network element, and the shared key between the function network element and the control network element to generate the symmetric key. The sending unit 102 sends the symmetric token generated by the processing unit 101 as the security parameter to the function network element.

In another embodiment, the processing unit 101 may perform, based on a symmetric key shared between the management network element and the control network element, a message authentication code algorithm on a function network element profile and an identifier of the function network element to generate a first message authentication code. The sending unit 102 sends the first message authentication code generated by the processing unit 101 as the security parameter to the function network element.

Alternatively, the processing unit 101 may perform, based on a symmetric key shared between the management network element and the control network element, a message authentication code algorithm on an identifier of the function network element and an identifier of the control network element to generate a third message authentication code. The sending unit 102 sends the third message authentication code generated by the processing unit 101 as the security parameter to the function network element.

In another embodiment, the registration apparatus 100 may further include a receiving unit 103. The receiving unit 103 is configured to receive a fourth message authentication code and an identifier of the function network element that are sent by the control network element. The processing unit 101 performs a message authentication code algorithm on the identifier of the function network element and the identifier of the control network element based on a derivation key to generate a fifth message authentication code, and compares whether the fourth message authentication code is consistent with the fifth message authentication code, to verify the fourth message authentication code. If the fourth message authentication code is consistent with the fifth message authentication code, the function network element determines that the fourth message authentication code is correct, determines that the registration request sent by the function network element is valid, and determines that the function network element can be authenticated. The sending unit 102 sends a verification result of the fourth message authentication code to the control network element.

In another embodiment, the processing unit 101 may perform a digital signature algorithm on a function network element profile and an identifier of the function network element based on a private key of the management network element to generate a first digital signature. The sending unit 102 sends the first digital signature generated by the processing unit 101 as the security parameter to the function network element.

When a form of hardware is used for implementation, the processing unit 101 may be a processor, the sending unit 102 may be a transmitter, and the receiving unit 103 may be a receiver. When the processing unit 101 is a processor, the sending unit 102 is a transmitter, and the receiving unit 103 is a receiver, the registration apparatus 100 may use a structure of a management network element shown in FIG. 13. The management network element shown in FIG. 13 may be an OAM, and the OAM may be the OAM in the foregoing method embodiments.

Figure 13:
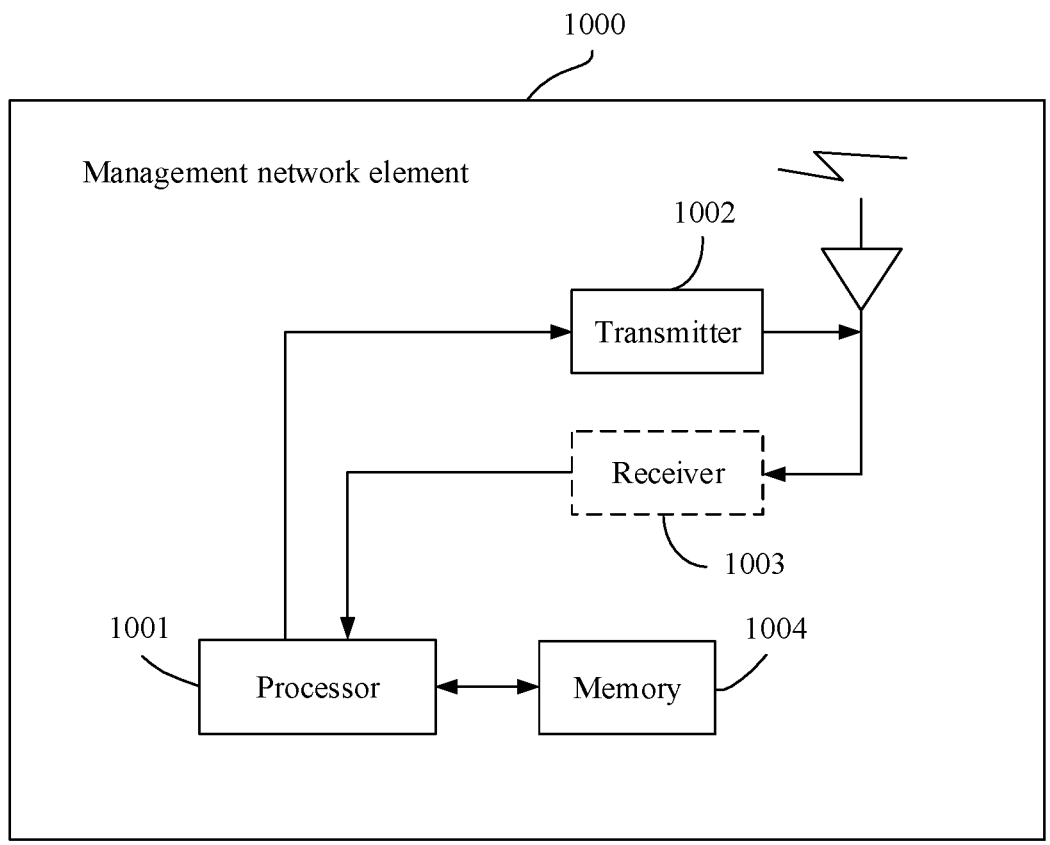
FIG. 13 is a schematic structural diagram of another registration apparatus applied to a management network element according to an embodiment of this application.

FIG. 13 is a schematic structural diagram of a management network element 1000 according to an embodiment of this application, namely, another schematic structural diagram of the registration apparatus 100. Referring to FIG. 13, the management network element 1000 includes a processor 1001, a transmitter 1002, and a receiver 1003. The processor 1001 may also be a controller. The processor 1001 is configured to support the management network element 1000 in implementing functions of the management network element in FIG. 2 to FIG. 11B. The transmitter 1002 and the receiver 1003 are configured to support the management network element 1000 in sending and receiving messages to and from a control network element and a function network element. The management network element 1000 may further include a memory 1004. The memory 1004 is configured to be coupled to the processor 1001, and the memory 1004 stores a program instruction and data that are necessary for the management network element 1000. The processor 1001, the transmitter 1002, the receiver 1003, and the memory 1004 are connected to each other. The memory 1004 is configured to store an instruction. The processor 1001 is configured to execute the instruction stored in the memory 1004, to control the transmitter 1002 and the receiver 1003 to send and receive data, thereby implementing operations in which the management network element performs corresponding functions in the foregoing methods.

In the embodiments of this application, for concepts, explanations, detailed descriptions, and other operations that are of the registration apparatus 100 and the management network element 1000 and that are related to the technical solutions provided in the embodiments of this application, refer to descriptions about the content in the foregoing methods or other embodiments. Details are not described herein again.

Figure 14:
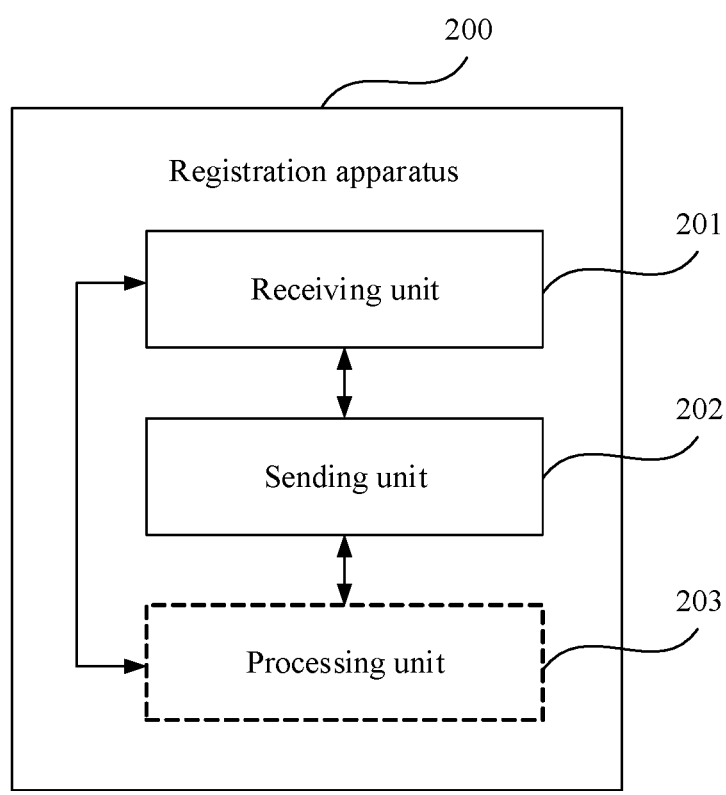
FIG. 14 is a schematic structural diagram of a registration apparatus applied to a function network element according to an embodiment of this application.

When a form of a software functional unit is used for implementation, FIG. 14 is a schematic structural diagram of a registration apparatus 200 based on a service-based architecture according to an embodiment of this application. The registration apparatus 200 based on a service-based architecture may be applied to a function network element. Referring to FIG. 14, the registration apparatus 200 applied to the function network element may include a receiving unit 201 and a sending unit 202. The receiving unit 201 is configured to receive configuration information and a security parameter that are sent by a management network element. The sending unit 202 is configured to send a registration request to a control network element based on the configuration information received by the receiving unit 201, where the registration request includes the security parameter received by the receiving unit 201.

The security parameter received by the receiving unit 201 may be an asymmetric token, a symmetric token, a first message authentication code, or a first digital signature generated by the management network element.

In one embodiment, the receiving unit 201 is further configured to receive a second message authentication code sent by the control network element and a third message authentication code sent by the management network element. The registration apparatus 200 further includes a processing unit 203. The processing unit 203 is configured to: compare whether the second message authentication code is consistent with the third message authentication code, and determine validity of the second message authentication code based on a comparison result.

In another embodiment, the receiving unit 201 is further configured to receive a second message authentication code sent by the control network element. The sending unit 202 sends the second message authentication code received by the receiving unit 201 to the management network element. The receiving unit 201 is further configured to receive a verification result of the second message authentication code sent by the control network element. The registration device 200 further includes a processing unit 203. The processing unit 203 is configured to determine validity of the second message authentication code based on the verification result that is of the second message authentication code and that is received by the receiving unit 201.

In another embodiment, the receiving unit 201 is further configured to receive a second digital signature sent by the control network element. The registration apparatus 200 further includes a processing unit 203. The processing unit 203 is configured to verify validity of the second digital signature based on the second digital signature received by the receiving unit 201 and content signed using the second digital signature.

In another embodiment, the registration apparatus 200 further includes a processing unit 203. The processing unit 203 is configured to establish a secure channel with the control network element based on a session key or a derivation key of a session key.

When a form of hardware is used for implementation, the receiving unit 201 may be a receiver, the sending unit 202 may be a transmitter, and the processing unit 203 may be a processor. When the receiving unit 201 is a receiver, the sending unit 202 is a transmitter, and the processing unit 203 is a processor, the registration apparatus 200 may use a structure of a function network element shown in FIG. 15.

Figure 15:
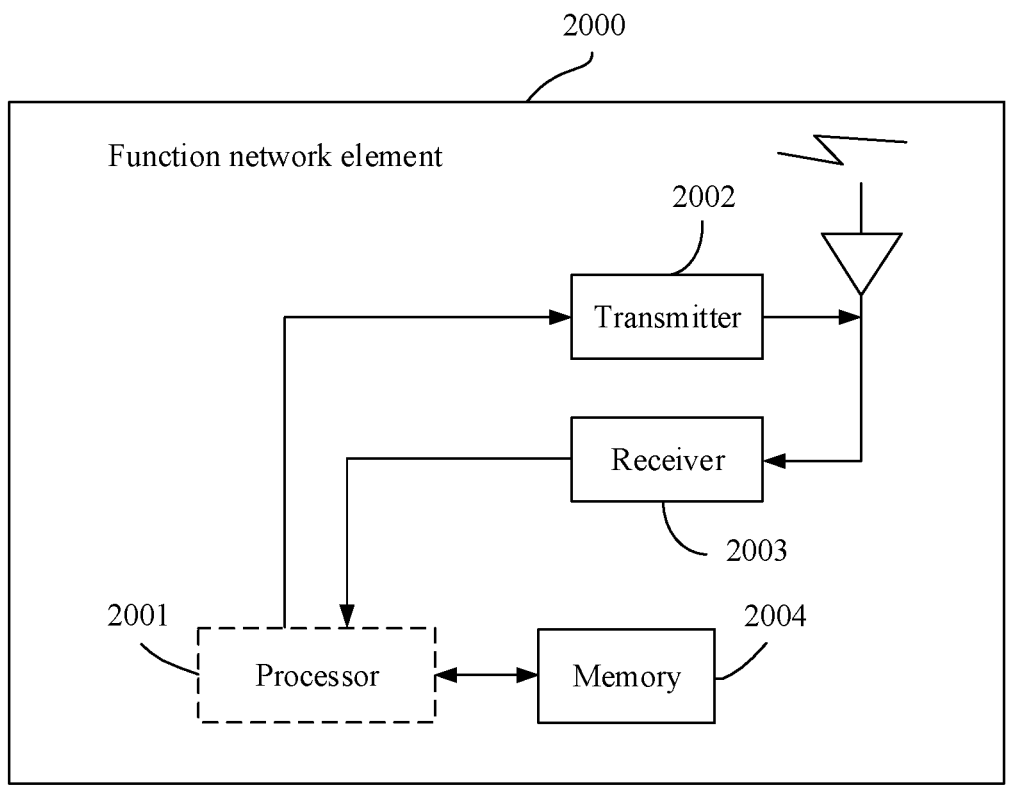
FIG. 15 is a schematic structural diagram of another registration apparatus applied to a function network element according to an embodiment of this application.

The function network element shown in FIG. 15 may be an NF, and the NF may be the NF in the foregoing method embodiments.

FIG. 15 is a schematic structural diagram of a function network element 2000 according to an embodiment of this application, namely, another schematic structural diagram of the registration apparatus 200. Referring to FIG. 15, the function network element 2000 includes a processor 2001, a transmitter 2002, and a receiver 2003. The processor 2001 may also be a controller. The processor 2001 is configured to support the function network element 2000 in implementing functions of the function network element in FIG. 2 to FIG. 11B. The transmitter 2002 and the receiver 2003 are configured to support the function network element 2000 in sending and receiving messages to and from a control network element and a management network element. The function network element 2000 may further include a memory 2004. The memory 2004 is configured to be coupled to the processor 2001, and the memory 2004 stores a program instruction and data that are necessary for the function network element 2000. The processor 2001, the transmitter 2002, the receiver 2003, and the memory 2004 are connected to each other. The memory 2004 is configured to store an instruction. The processor 2001 is configured to execute the instruction stored in the memory 2004, to control the transmitter 2002 and the receiver 2003 to send and receive data, thereby implementing operations in which the function network element performs corresponding functions in the foregoing methods.

In the embodiments of this application, for concepts, explanations, detailed descriptions, and other operations that are of the registration apparatus 200 and the function network element 2000 and that are related to the technical solutions provided in the embodiments of this application, refer to descriptions about the content in the foregoing methods or other embodiments. Details are not described herein again.

Figure 16:
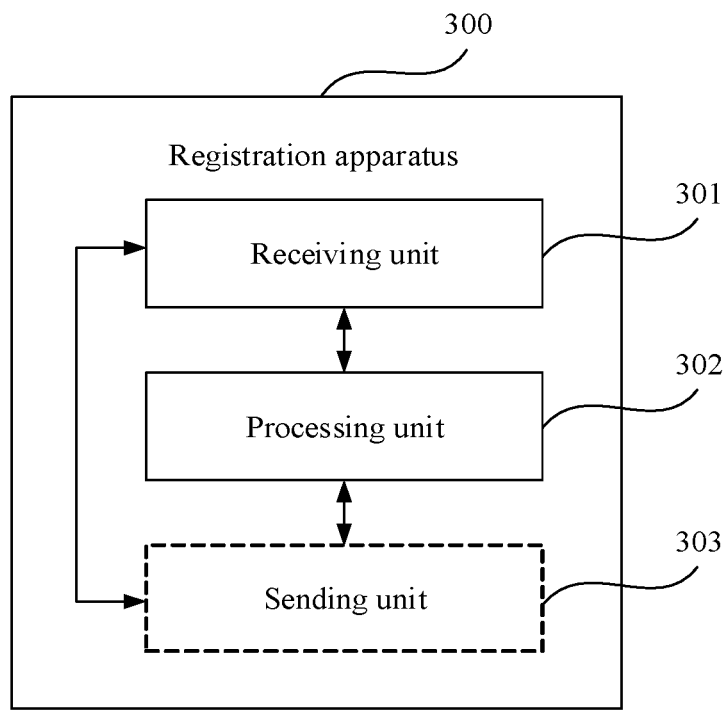
FIG. 16 is a schematic structural diagram of a registration apparatus applied to a control network element according to an embodiment of this application.

When a form of a software functional unit is used for implementation, FIG. 16 is a schematic structural diagram of a registration apparatus 300 based on a service-based architecture according to an embodiment of this application. The registration apparatus 300 based on a service-based architecture may be applied to a control network element. Referring to FIG. 16, the registration apparatus 300 applied to the function network element may include a receiving unit 301 and a processing unit 302. The receiving unit 301 is configured to receive a registration request sent by a function network element. The registration request includes a security parameter. The processing unit 302 is configured to: verify correctness of the security parameter received by the receiving unit 301, and determine validity of the registration request based on the correctness of the security parameter.

In one embodiment, the security parameter includes an asymmetric token. The processing unit 302 decrypts the asymmetric token using a private key of the control network element, to obtain a digital signature, and verifies correctness of the digital signature using a public key of the management network element and signed content.

In another embodiment, the security parameter includes a symmetric token. The processing unit 302 decrypts the symmetric token using a symmetric key, to obtain a message authentication code, and verifies correctness of the message authentication code using the symmetric key and content that is protected by the message authentication code.

In another embodiment, the security parameter includes a first message authentication code. The processing unit 302 verifies correctness of the first message authentication code using a symmetric key shared between the management network element and the control network element and content protected by the first message authentication code.

The processing unit 302 is further configured to: manage the symmetric key shared between the management network element and the control network element, and perform a message authentication code algorithm on an identifier of the function network element and an identifier of the control network element, to generate a second message authentication code. The registration apparatus 300 further includes a sending unit 303. The sending unit 303 is configured to send the second message authentication code generated by the processing unit 302 to the function network element, so that the function network element performs authentication on the control network element using the second message authentication code.

In another embodiment, the security parameter includes a first digital signature. The processing unit 302 verifies correctness of the first digital signature using a public key of the management network element and content signed using the first digital signature.

The processing unit 302 is further configured to perform a digital signature algorithm on an identifier of the function network element and an identifier of the control network element based on a private key of the control network element, to generate a second digital signature. The registration apparatus 300 further includes a sending unit 303. The sending unit 303 is configured to send the second digital signature generated by the processing unit 302 to the function network element, so that the function network element performs authentication on the control network element using the second digital signature.

In another embodiment, the receiving unit 301 is configured to receive an identifier of the function network element and a fourth message authentication code that are sent by the function network element. The registration apparatus 300 further includes a sending unit 303. The sending unit 303 sends the identifier of the function network element and the fourth message authentication code that are received by the receiving unit 301 to the management network element. The receiving unit 301 is further configured to receive a fifth message authentication code sent by the management network element. The processing unit 302 is further configured to compare whether the fourth message authentication code is consistent with the fifth message authentication code, to verify correctness of the fourth message authentication code.

In a further possible implementation, the receiving unit 301 is configured to receive an identifier of the function network element and a fourth message authentication code that are sent by the function network element. The registration apparatus 300 further includes a sending unit 303. The sending unit 303 sends the identifier of the function network element and the fourth message authentication code that are received by the receiving unit 301 to the management network element. The receiving unit 301 is further configured to receive a verification result that is of the fourth message authentication code and that is sent by the management network element. The processing unit 302 determines correctness of the fourth message authentication code based on the verification result that is of the fourth message authentication code and that is received by the receiving unit 301.

When a form of hardware is used for implementation, the receiving unit 301 may be a receiver, the processing unit 302 may be a processor, and the sending unit 303 may be a transmitter. When the receiving unit 301 is a receiver, the processing unit 302 is a processor, and the sending unit 303 is a transmitter, the registration apparatus 300 may use a structure of a control network element shown in FIG. 17. The control network element shown in FIG. 17 may be an NRF, and the NRF may be the NRF in the foregoing method embodiments.

Figure 17:
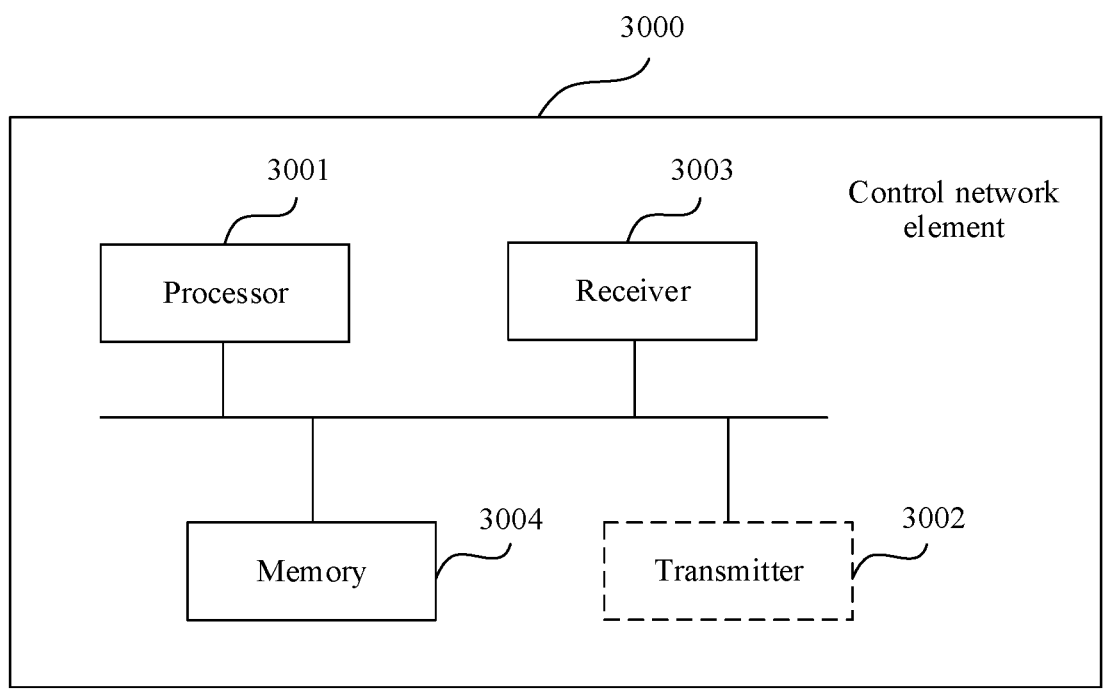
FIG. 17 is a schematic structural diagram of another registration apparatus applied to a control network element according to an embodiment of this application.

FIG. 17 is a schematic structural diagram of a control network element 3000 according to an embodiment of this application, that is, another schematic structural diagram of the registration apparatus 300. Referring to FIG. 17, the control network element 3000 includes a processor 3001, a transmitter 3002, and a receiver 3003. The processor 3001 may also be a controller. The processor 3001 is configured to support the control network element 3000 in implementing functions of the control network element in FIG. 2 to FIG. 11B. The transmitter 3002 and the receiver 3003 are configured to support the control network element in sending and receiving messages to and from a function network element and a management network element. The control network element 3000 may further include a memory 3004. The memory 3004 is configured to be coupled to the processor 3001, and the memory 3004 stores a program instruction and data that are necessary for the control network element 3000. The processor 3001, the transmitter 3002, the receiver 3003, and the memory 3004 are connected to each other. The memory 3004 is configured to store an instruction. The processor 3001 is configured to execute the instruction stored in the memory 3004, to control the transmitter 3002 and the receiver 3003 to send and receive data, thereby implementing operations in which the control network element performs corresponding functions in the foregoing methods.

In the embodiments of this application, for concepts, explanations, detailed descriptions, and other operations that are of the registration apparatus 300 and the control network element 3000 and that are related to the technical solutions provided in the embodiments of this application, refer to descriptions about the content in the foregoing methods or other embodiments. Details are not described herein again.

It should be noted that the processor in the embodiments of this application may be a central processing unit (CPU), a general-purpose processor, a digital signal processor (digital signal processing, DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The memory may be integrated in the processor, or may be separate from the processor.

In an implementation, functions of the receiver and the transmitter may be implemented using a transceiver circuit or a dedicated transceiver chip. It may be considered that the processor may be implemented using a dedicated processing chip, a processing circuit, a processor, or a general-purpose chip.

In another implementation, program code for implementing functions of the processor, the receiver, and the transmitter is stored in the memory, and the general purpose processor implements the functions of the processor, the receiver, and transmitter by executing the code in the memory.

According to the methods provided in the embodiments of this application, an embodiment of this application further provides a communications system, where the communications system includes the management network element, the function network element, and the control network element described above.

An embodiment of this application further provides a chip, where the chip is connected to a memory, and is configured to read and execute a software program stored in the memory, to implement functions performed by the management network element in the foregoing embodiments.

An embodiment of this application further provides a chip, where the chip is connected to a memory, and is configured to read and execute a software program stored in the memory, to implement functions performed by the function network element in the foregoing embodiments.

An embodiment of this application further provides a chip, where the chip is connected to a memory, and is configured to read and execute a software program stored in the memory, to implement functions performed by the control network element in the foregoing embodiments.

An embodiment of this application further provides a computer storage medium. The computer storage medium stores some instructions. When the instructions are executed, the registration methods in the foregoing method embodiments may be completed.

An embodiment of this application further provides a computer program product. The computer program product includes a computer program, and the computer program is used to perform the registration methods in the foregoing method embodiments.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

What is claimed is:

1. A registration method based on a service-based architecture, comprising:
receiving, by a control network element, a registration request sent by a function network element, wherein the registration request comprises a security parameter; and
verifying, by the control network element, correctness of the security parameter, and determining validity of the registration request based on the correctness of the security parameter, wherein the security parameter comprises a token, and the token is generated by a management network element and sent to the function network element, wherein the token is generated by the management network element by encrypting a digital signature, a function network element profile, an identifier of the function network element, and a shared key between the function network element and the control network element based on a public key of the control network element, wherein
the digital signature is generated by the management network element by performing a digital signature algorithm on the function network element profile, the identifier of the function network element, and the shared key between the function network element and the control network element based on a private key of the management network element; and
the verifying, by the control network element, correctness of the security parameter comprises:
decrypting, by the control network element, the token using a private key of the control network element, to obtain the digital signature; and
verifying correctness of the digital signature using a public key of the management network element and signed content, wherein
the signed content comprises the shared key between the function network element and the control network element, the identifier of the function network element, and the function network element profile.

2. The method according to claim 1, wherein the token is generated by the management network element by encrypting a message authentication code, a function network element profile, an identifier of the function network element, and a shared key between the function network element and the control network element based on a symmetric key shared between the management network element and the control network element, wherein
the message authentication code is generated by the management network element by performing a message authentication code algorithm on the shared key between the function network element and the control network element, the identifier of the function network element, and the function network element profile based on the symmetric key shared between the management network element and the control network element; and the verifying, by the control network element, correctness of the security parameter comprises:

decrypting, by the control network element, the token using the symmetric key, to obtain the message authentication code; and verifying correctness of the message authentication code using the symmetric key and content that is protected by the message authentication code, wherein the content protected by the message authentication code comprises the shared key between the function network element and the control network element, the identifier of the function network element, and the function network element profile, and may further comprise an identifier of the control network element.

3. The method according to claim 2, further comprising:

generating, by the control network element, an additional message authentication code by performing a message authentication code algorithm on an identifier of the control network element and the identifier of the function network element based on the symmetric key shared between the management network element and the control network element; and sending, by the control network element, a registration response to the function network element, wherein the registration response includes the additional message authentication code.

4. The method according to claim 1, wherein after the receiving, by a control network element, a registration request sent by a function network element, the method further comprises:

establishing, by the control network element when determining that the registration request is valid, a secure channel with the function network element based on a session key or a derivation key of a session key; wherein the control network element obtains the session key by decrypting the token, wherein the token is generated based on the session key, and the session key is generated by the management network element by encrypting an identifier of the function network element based on a preset root key; or the control network element obtains the session key from the management network element, wherein the session key is generated by the management network element by encrypting the identifier of the function network element based on a derivation key, and the derivation key is obtained by the management network element by performing key derivation on a preset root key, or the derivation key is a key of the function network element that is stored by the management network element.

5. The method according to claim 1, further comprising:

sending, by the control network element, a registration response to the function network element, wherein the registration response indicates whether the function network element is successfully registered.

6. A registration apparatus, comprising:

one or more hardware processor configured to perform operations of:

receiving, by a control network element, a registration request sent by a function network element, wherein the registration request comprises a security parameter; and verifying, by the control network element, correctness of the security parameter, and determining validity of the registration request based on the correctness of the security parameter, wherein the security parameter comprises a token, and the token is generated by a management network element and sent to the function network element, wherein the token is generated by the management network element by encrypting a digital signature, a function network element profile, an identifier of the function network element, and a shared key between the function network element and the control network element based on a public key of the control network element, wherein the digital signature is generated by the management network element by performing a digital signature algorithm on the function network element profile, the identifier of the function network element, and the shared key between the function network element and the control network element based on a private key of the management network element; and the verifying, by the control network element, correctness of the security parameter comprises:

decrypting, by the control network element, the token using a private key of the control network element, to obtain the digital signature; and verifying correctness of the digital signature using a public key of the management network element and signed content, wherein the signed content comprises the shared key between the function network element and the control network element, the identifier of the function network element, and the function network element profile.

7. The apparatus according to claim 6, wherein the token is generated by the management network element by encrypting a message authentication code, a function network element profile, an identifier of the function network element, and a shared key between the function network element and the control network element based on a symmetric key shared between the management network element and the control network element, wherein the message authentication code is generated by the management network element by performing a message authentication code algorithm on the shared key between the function network element and the control network element, the identifier of the function network element, and the function network element profile based on the symmetric key shared between the management network element and the control network element; and the verifying, by the control network element, correctness of the security parameter comprises:

decrypting, by the control network element, the token using the symmetric key, to obtain the message authentication code; and verifying correctness of the message authentication code using the symmetric key and content that is protected by the message authentication code, wherein the content protected by the message authentication code comprises the shared key between the function network element and the control network element, the identifier of the function network element, and the function network element profile, and may further comprise an identifier of the control network element.

8. The apparatus according to claim 7, wherein the operations further comprise:

generating, by the control network element, an additional message authentication code by performing a message authentication code algorithm on an identifier of the control network element and the identifier of the function network element based on the symmetric key shared between the management network element and the control network element; and sending, by the control network element, a registration response to the function network element, wherein the registration response includes the additional message authentication code.

9. The apparatus according to claim 6, wherein after the receiving, by a control network element, a registration request sent by a function network element, the operations further comprise:

establishing, by the control network element when determining that the registration request is valid, a secure channel with the function network element based on a session key or a derivation key of a session key; wherein the control network element obtains the session key by decrypting the token, wherein the token is generated based on the session key, and the session key is generated by the management network element by encrypting an identifier of the function network element based on a preset root key; or the control network element obtains the session key from the management network element, wherein the session key is generated by the management network element by encrypting the identifier of the function network element based on a derivation key, and the derivation key is obtained by the management network element by performing key derivation on a preset root key, or the derivation key is a key of the function network element that is stored by the management network element.

10. The apparatus according to claim 6, wherein the operations further comprise:

sending, by the control network element, a registration response to the function network element, wherein the registration response indicates whether the function network element is successfully registered.

11. A non-transitory computer-readable storage medium storing instructions, which when executed by one or more processors, cause the one or more processors to perform operations comprising:

receiving, by a control network element, a registration request sent by a function network element, wherein the registration request comprises a security parameter; and verifying, by the control network element, correctness of the security parameter, and determining validity of the registration request based on the correctness of the security parameter, wherein the security parameter comprises a token, and the token is generated by a management network element and sent to the function network element, wherein the token is generated by the management network element by encrypting a digital signature, a function network element profile, an identifier of the function network element, and a shared key between the function network element and the control network element based on a public key of the control network element, wherein the digital signature is generated by the management network element by performing a digital signature algorithm on the function network element profile, the identifier of the function network element, and the shared key between the function network element and the control network element based on a private key of the management network element; and the verifying, by the control network element, correctness of the security parameter comprises:

decrypting, by the control network element, the token using a private key of the control network element, to obtain the digital signature; and verifying correctness of the digital signature using a public key of the management network element and signed content, wherein the signed content comprises the shared key between the function network element and the control network element, the identifier of the function network element, and the function network element profile.

12. The non-transitory computer-readable storage medium according to claim 11, wherein the token is generated by the management network element by encrypting a message authentication code, a function network element profile, an identifier of the function network element, and a shared key between the function network element and the control network element based on a symmetric key shared between the management network element and the control network element, wherein the message authentication code is generated by the management network element by performing a message authentication code algorithm on the shared key between the function network element and the control network element, the identifier of the function network element, and the function network element profile based on the symmetric key shared between the management network element and the control network element; and the verifying, by the control network element, correctness of the security parameter comprises:

decrypting, by the control network element, the token using the symmetric key, to obtain the message authentication code; and verifying correctness of the message authentication code using the symmetric key and content that is protected by the message authentication code, wherein the content protected by the message authentication code comprises the shared key between the function network element and the control network element, the identifier of the function network element, and the function network element profile, and may further comprise an identifier of the control network element.

13. The non-transitory computer-readable storage medium according to claim 12, wherein the operations further comprise:

generating, by the control network element, an additional message authentication code by performing a message authentication code algorithm on an identifier of the control network element and the identifier of the function network element based on the symmetric key shared between the management network element and the control network element; and sending, by the control network element, a registration response to the function network element, wherein the registration response includes the additional message authentication code.

14. The non-transitory computer-readable storage medium according to claim 11, wherein after the receiving, by a control network element, a registration request sent by a function network element, the operations further comprise:

establishing, by the control network element when determining that the registration request is valid, a secure channel with the function network element based on a session key or a derivation key of a session key; wherein the control network element obtains the session key by decrypting the token, wherein the token is generated based on the session key, and the session key is generated by the management network element by encrypting an identifier of the function network element based on a preset root key; or the control network element obtains the session key from the management network element, wherein the session key is generated by the management network element by encrypting the identifier of the function network element based on a derivation key, and the derivation key is obtained by the management network element by performing key derivation on a preset root key, or the derivation key is a key of the function network element that is stored by the management network element.

15. The non-transitory computer-readable storage medium according to claim 11, wherein the operations further comprise:
sending, by the control network element, a registration response to the function network element, wherein the registration response indicates whether the function network element is successfully registered.

* * * * *